United States Patent

Yoshimura et al.

[11] Patent Number: 5,906,885
[45] Date of Patent: *May 25, 1999

[54] MAGNETIC RECORDING MEDIUM

[75] Inventors: Youichi Yoshimura, Shimofusa-machi; Shigeharu Watase, Saku, both of Japan

[73] Assignee: TDK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/622,282

[22] Filed: Mar. 25, 1996

[30] Foreign Application Priority Data

Mar. 28, 1995 [JP] Japan ................................. 7-093182

[51] Int. Cl.⁶ .................................................. G11B 5/708
[52] U.S. Cl. ...................... 428/212; 428/216; 428/323; 428/336; 428/65.3; 428/694 BS; 428/694 SG; 428/900; 427/130
[58] Field of Search ..................... 428/212, 216, 428/323, 336, 65.3, 694 BS, 694 SG, 900; 427/130

[56] References Cited

U.S. PATENT DOCUMENTS

| 4,233,352 | 11/1980 | Ono et al. | 427/130 |
| 5,268,420 | 12/1993 | Nishimura et al. | 524/857 |
| 5,458,964 | 10/1995 | Okazaki et al. | 428/323 |
| 5,549,955 | 8/1996 | Kawamata et al. | 428/65.3 |

FOREIGN PATENT DOCUMENTS

| 57-198536 | 12/1982 | Japan . |
| 58-29626 | 2/1983 | Japan . |
| 4-248116 | 9/1992 | Japan . |
| 5-59490 | 8/1993 | Japan . |

*Primary Examiner*—Stevan A. Resan
*Attorney, Agent, or Firm*—Oblon, Spivak, McClelland, Maier & Neustadt, P.C.

[57] ABSTRACT

A magnetic recording medium includes a flexible substrate, a coating layer formed on the flexible substrate, and a magnetic layer formed on the coating layer. The coating layer contains a binder and nonmagnetic particles and has a thickness in the range of 0.05 to 0.7 μm as a result of a stretching treatment performed at least once after application of the coating layer on the flexible substrate. The magnetic layer contains magnetic powder, a binder and an abrasive and has a thickness in the range of 0.05 to 1.0 μm. The nonmagnetic particles contained in the coating layer has an average particle size in the range of 0.01 to 0.08 μm. The abrasive contained in the magnetic layer has an average particle size in the range of 0.05 to 0.8 μm and satisfies conditions defined by the following equations (1) and (2):

$$d_{mx} \leq (d_{av} \times 2.0) + 0.5 \quad \text{equation (1)}$$

$$d_{mx} \leq t_c + t_m + 0.5 \quad \text{equation (2)}$$

wherein $d_{mx}$ represents a maximum particle size of the abrasive, $d_{av}$ represents an average particle size of the abrasive, $t_c$ represents a thickness of the coating layer, and $t_m$ represents a thickness of the magnetic layer. With this arrangement, the magnetic recording medium is excellent in productivity and further improves a surface property of the thin magnetic layer. This achieves high outputs at a region of shorter wavelength and further achieves excellent running durability.

10 Claims, 1 Drawing Sheet

MAGNETIC RECORDING MEDIUM

BACKGROUND OF THE INVENTION

1. Field of the Invention

The present invention relates to a magnetic recording medium, and particularly to a coating-type magnetic recording medium which is suitable for the high density recording.

2. Description of the Prior Art

In recent years, various methods have been proposed for satisfying the demand for the high density recording of the magnetic recording medium, for example, using further fined ferromagnetic powder, using alloy magnetic powder, increasing magnetization and coercive force of the magnetic layer, smoothing a surface of a magnetic layer of the medium, achieving vertical (or oblique) orientation of the magnetic powder in the magnetic layer, reducing the magnetic layer in thickness, or the like. In addition to the demand for the high density recording, it has been also required to reduce size of the magnetic recording medium. Accordingly, it has been the big aim to reduce a thickness of the medium, particularly, a thickness of the magnetic layer. If, however, the magnetic layer is simply reduced in thickness, the effect of a final calendering treatment is not notably reflected. Thus, a surface roughness of the magnetic layer is not improved to result in a low electromagnetic transducer property.

To cope with such a problem, a method has been proposed to provide an undercoating layer between a magnetic layer and a flexible substrate for smoothing a surface of the medium, particularly, a surface of the magnetic layer.

For example, Japanese First (unexamined) Patent Publication No. SHO 57-198536 has proposed a method of forming a flexible substrate, applying an undercoating layer on the flexible substrate, and forming a magnetic layer thereon after drying the undercoating layer. Further, Japanese Second (examined) Patent Publication No. HEI 5-59490 has proposed a method of applying an undercoating layer on a flexible substrate and forming a magnetic layer while the undercoating layer is still in a wet state. Although it is not for exclusive use in the magnetic recording medium, Japanese First (unexamined) Patent Publication No. SHO 58-29626 has proposed a method for producing a polyester film for improving an adhesive property, wherein a coating layer (adhesive layer) containing polyester as a main component is applied on a polyester film base, and then a stretching (or orientation) treatment and heat treatment are performed to achieve orientation and crystallization thereof.

However, in the method proposed in Japanese First Patent Publication SHO 57-198536, although the functions of the undercoating layer and the magnetic layer can be optimized, a fine thickness variation is liable to occur upon the formation of the undercoating layer, thereby leading to a complex process control. Although it is possible to perform a calendering treatment after drying the undercoating layer for preventing such a fine thickness variation, this may cause the production processes to be further complicated so as to lower the production efficiency. Further, since the magnetic layer is formed after drying the undercoating layer, the magnetic layer is susceptible to lowering of the orientation.

On the other hand, in the method proposed in Japanese Second Patent Publication No. HEI 5-59490, it is possible to provide the undercoating layer and the magnetic layer through one coating process so that the production processes can be simplified as compared with the foregoing method. However, it is possible that disturbance of the interface between the undercoating layer and the magnetic layer and mixing of the coating materials are caused to incur output fluctuation of the produced magnetic recording medium. Further, since the application of the undercoating layer and the magnetic layer can not be performed without considering matching of the coating materials of the undercoating and magnetic layers, selecting ranges of the coating materials are so limited that compositions themselves of the undercoating and magnetic layers can not be optimized.

On the other hand, the method disclosed in Japanese First Patent Publication No. SHO 58-29626 only aims at the adhesive property of the film relative to one to be attached thereto. Thus, setting of a specification of the base film as an undercoating layer in the magnetic recording medium having a thin magnetic layer and suitable for the high density recording is not proposed in this publication.

As a technique similar to the foregoing polyester film producing method, Japanese First (unexamined) Patent Publication No. HEI 4-248116 has proposed a magnetic recording medium, wherein a coating liquid mainly containing carbon black and water-soluble polyurethane resin is applied on a polyester film and then a magnetic layer is formed after a stretching (or orientation) treatment. However, this proposed technique mainly aims at reducing an electrical resistance, wherein the magnetic layer has a large thickness of 4 $\mu$m and the carbon black has a large average particle size in the range of 0.1 to 0.5 $\mu$m, and thus, does not aim at improving a surface roughness of an applied thin magnetic layer.

Further, since the carbon black has poor dispersibility, a surface of the base film is liable to be roughened due to agglomeration. Thus, the carbon black is not suitable for the magnetic recording medium aiming at the high density recording. Further, since the carbon black is impurities to be removed upon recycling the base film, it is not preferable also in view of the effective use of resources as a social request.

The present invention has been made under these circumstances and has an object to provide a magnetic recording medium which is capable of achieving high outputs in the region of shorter wavelength and excellent in running durability and productivity.

SUMMARY OF THE INVENTION

In order to achieve the foregoing object, the present inventors has made a diligent study concerning a relationship between a thin magnetic layer and a coating layer formed on a substrate, and found optimum conditions of the coating layer and the magnetic layer which are, not to mention excellent productivity, capable of achieving high outputs in the region of shorter wavelength and further excellent in running durability, by improving a surface property of the thin magnetic layer.

According to one aspect of the present invention, a magnetic recording medium comprises a flexible substrate; a coating layer formed on the flexible substrate; and a magnetic layer formed on the coating layer, wherein the coating layer contains a binder and nonmagnetic particles and has a thickness in the range of 0.05 to 0.7 $\mu$m as a result of a stretching (or orientation) treatment performed at least once after application of the coating layer on the flexible substrate, wherein the magnetic layer contains magnetic powder, a binder and an abrasive and has a thickness in the range of 0.05 to 1.0 $\mu$m, wherein the nonmagnetic particles contained in the coating layer has an average particle size in the range of 0.01 to 0.08 $\mu$m, and wherein the abrasive contained in the magnetic layer has an average particle size in the range of 0.05 to 0.8 µm and satisfies conditions defined by the following equations (1) and (2):

$$d_{mx} \leq (d_{av} \times 2.0) + 0.5 \quad \text{equation (1)}$$

$$d_{mx} \leq (t_c + t_m) + 0.5 \quad \text{equation (2)}$$

wherein $d_{mx}$ represents a maximum particle size of the abrasive, $d_{av}$ represents an average particle size of the abrasive, $t_c$ represents a thickness of the coating layer, and $t_m$ represents a thickness of the magnetic layer.

It may be arranged that the thickness of the coating layer is in the range of 0.1 to 0.5 µm, the thickness of the magnetic layer is in the range of 0.08 to 0.7 µm, the average particle size of the nonmagnetic particles is in the range of 0.02 to 0.06 µm, and the average particle size of the abrasive is in the range of 0.08 to 0.5 µm.

It may be arranged that the nonmagnetic particles are contained in the coating layer in the range of 3 to 60% by weight.

It may be arranged that the nonmagnetic particles are contained in the coating layer in the range of 20 to 50% by weight.

It may be arranged that the abrasive is contained in the magnetic layer in the range of 0.1 to 20% by weight.

It may be arranged that the abrasive is contained in the magnetic layer in the range of 0.5 to 15% by weight.

It may be arranged that the abrasive is contained in the magnetic layer in the range of 1.0 to 10% by weight.

It may be arranged that the binder contained in the coating layer is one of water-soluble and water-dispersive resins.

It may be arranged that the stretching (or orientation) treatment of the coating layer is performed, being integral with the flexible substrate, with a stretching ratio in the range of 3 to 10 times.

It may be arranged that the stretching (or orientation) treatment of the coating layer is performed, being integral with the flexible substrate, with a stretching ratio in the range of 4 to 8 times.

It may be arranged that the magnetic recording medium is a magnetic tape.

It may be arranged that the magnetic recording medium is a floppy disk.

According to one aspect of the present invention, the magnetic recording medium is provided on the flexible substrate with the coating layer including the binder and the nonmagnetic particles and having the given thickness as a result of the stretching (or orientation) treatment performed at least once, and further provided with the given magnetic layer formed on the coating layer. Thus, the magnetic recording medium is excellent in productivity and further improves the surface roughness of the thin magnetic layer. This achieves the high outputs at the shorter wavelength region and further achieves the excellent running durability.

DETAILED DESCRIPTION OF THE INVENTION

Figure 1:
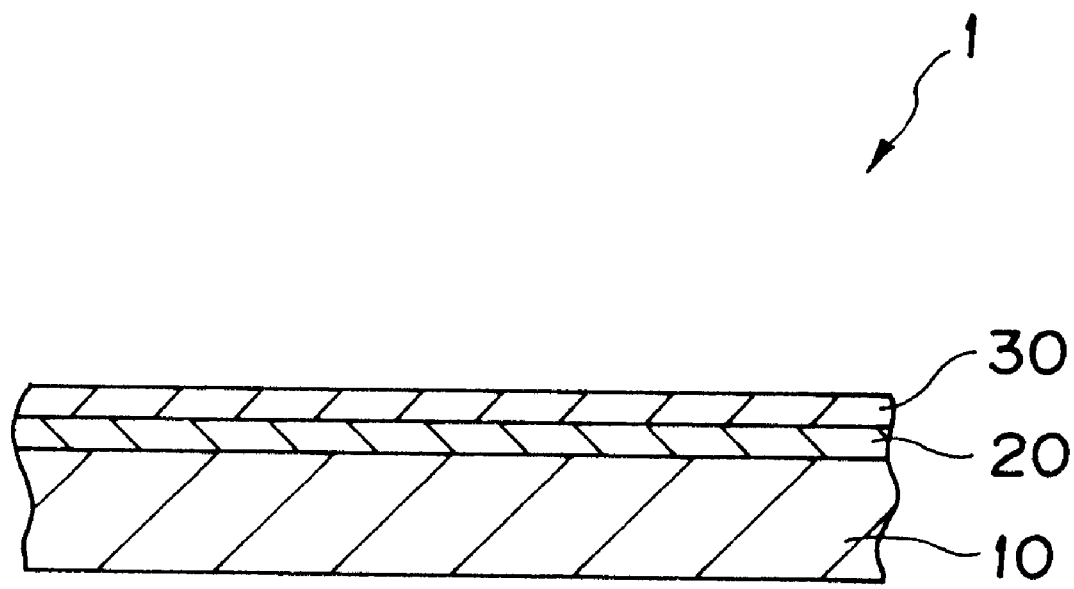
FIG. 1 is a sectional view showing a magnetic recording medium according to a preferred embodiment of the present invention.

Now, a preferred embodiment of the present invention will be described hereinbelow with reference to FIG. 1.

FIG. 1 is a sectional view showing a magnetic recording medium 1 according to the preferred embodiment of the present invention. As shown in the figure, the magnetic recording medium 1 includes a flexible substrate 10, a coating layer 20 applied on the substrate 10 and given a stretching (or orientation) treatment, and a magnetic layer 30 formed on the coating layer 20.

The flexible substrate 10 may be any of the well-known plastic films such as, for example, polyesters like polyethylene terephthalate and polyethylene-2,6-naphthalate, polyamides and polyimides. On the other hand, since the polyamides and the polyimides have small stretching (or orientation) magnifications, levels of the thickness uniformity achieved by the stretching (or orientation) treatment tend to be low.

No particular limitation is available to a thickness of the substrate 10. On the other hand, for satisfying the demand for reduction in size of the magnetic recording medium, the thickness of the substrate 10 may be set in the range of 2 to 14 µm, and preferably 3 to 10 µm.

The coating layer 20 formed on the substrate 10 contains a binder and nonmagnetic particles. After being applied on the substrate 10 and dried, the coating layer 20 integral with the substrate 10 is subjected to a stretching (or orientation) treatment at least once. A final thickness of the coating layer 20 after the stretching is set in the range of 0.05 to 0.7 µm, and preferably 0.1 to 0.5 µm.

If the thickness of the coating layer 20 becomes less than 0.05 µm, falling-off of the particles increases during the coating process of the magnetic layer so that the drop-out as a tape quality disadvantageously increases. On the other hand, if the thickness of the coating layer 20 exceeds 0.7 µm, cracks or the like are liable to occur in the coating layer upon stretching (or orientation) treatment so that it is difficult to achieve a good surface roughness of the coating layer. The stretching (or orientation) treatment of the coating layer 20 is performed, being integral with the substrate 10 as described above, with a stretching ratio in the range of 3 to 10 times, and preferably 4 to 8 times. Without such a stretching (or orientation) treatment of the coating layer 20, a surface of the magnetic layer formed on the coating layer 20 can not be effectively smoothed by means of a final calendering treatment or the like. Specifically, in this preferred embodiment, by arranging the coating layer 20 to contain the given nonmagnetic particles and to be subjected to the given stretching treatment to have a thickness in the given range, the coating layer 20 itself is provided with workability (flexible deformability) so as to improve the surface property of the thin magnetic layer 30 achieved by the calendering treatment.

It is preferable in view of productivity that the application of the coating layer 20 is performed within the line of extrusion molding of the flexible substrate 10 and that the at least once stretching (or orientation) treatment of the coating layer 20 is also performed in the same line.

The nonmagnetic particles contained in the coating layer 20 have an average particle size in the range of 0.01 to 0.08 µm, and preferably 0.02 to 0.08 µm. If this value becomes less than 0.01 µm, the nonmagnetic particles can not disperse sufficiently in the coating material. On the other hand, if this value exceeds 0.08 µm, the surface roughness of the coating layer 20 is enlarged so as to induce lowering of the output of the magnetic recording medium as a final product.

The average particle size of the nonmagnetic particles contained in the coating layer 20 is defined as follows in this preferred embodiment. Specifically, the average particle size is determined by measuring the maximum length of each of the particles and then deriving the arithmetic mean of the measured maximum lengths. As a specific measuring method, the magnetic recording medium is covered by the thermosetting epoxy resin and then cut into thin pieces by a diamond cutter to obtain samples. The samples are observed by a transmission electron microscope (TEM) (produced by Nippon Denki K.K. and marketed under product code of "JEM100CX"), increasing observing portions depending on necessity to measure 100 particles or more in total, so that the average particle size is derived as a mean value thereof. The thickness of the coating layer 20 is derived in the following manner. The magnetic recording medium is covered by the thermosetting epoxy resin and then cut into thin pieces by a diamond cutter to obtain samples. The samples are observed by a transmission electron microscope (TEM) (produced by Nippon Denki K.K. and marketed under product code of "JEM100CX"), changing observing portions to measure thicknesses of 10 portions, so that the thickness of the coating layer 20 is derived as a mean value thereof.

As concrete examples of the nonmagnetic particles, silica, silica sol, alumina, alumina sol, zirconium sol, calcium carbonate, titanium oxide, polystyrene resin, styrene-efhylene glycol, styrene-divinyl benzene, methyl methacrylate-divinyl benzene, silicone resin, melamine resin, and formaldehyde resin may be cited. These compounds may be used singly or in combination. Of these, it is preferable to use the particles which are normally colorless or white in view of recycling of the flexible substrate 10.

These nonmagnetic particles are normally contained in the coating layer 20 in the range of 3 to 60% by weight, and preferably 20 to 50% by weight. If this value becomes less than 3% by weight, the running stability of the substrate is largely deteriorated upon application of the magnetic layer. On the other hand, if this value exceeds 60% by weight, the number of the nonmagnetic particles falling off from the coating layer 20 is increased, thereby increasing the drop-out or the like.

The binder (resin component) used for the formation of the coating layer 20 is selected from thermoplastic resins and thermosetting resins. Of these, it is preferable to use water-soluble or water-dispersive resins since an explosion-proof structure is not necessary for the production line and the environment is not adversely affected. As concrete examples, polyester type resins, urethane type resins, (meth) acrylic type resins, polypropylene type resins, polyamide resins, vinyl type resins, butadiene type resins, epoxy type resins, silicone type resins, carbonate type resins, melamine type resins, vinylidene chloride type resins, vinyl alcohol type resins, and gelatins, all of which are water soluble or water dispersive, may be cited. The binder may be one of them, or a copolymer or mixture of them.

As the water-soluble or water-dispersive polyester type resins, ones having sulfonate, carboxylate, polyoxyalkylene glycol and the like in the molecule are used. For introducing sulfonate groups into the molecules, sulfonic acid alkali metal salt type compounds or sulfonic acid amine salt type compounds, such as, 5-Na-sulfoisophthalic acid, 5-ammonium sulfoisophthalic acid, 4-methyl ammonium sulfoisophthalic acid, 2-Na-sulfoterephthalic acid, 5-K-sulfoisophthalic acid 4-K-sulfoisophthalic acid, 2-K-sulfoisophthalic acid, and Na-sulfosuccinphthalic acid, can be used, for example. It is preferable that polyatomic carboxylic acid or polyatomic alcohol having the sulfonate groups is normally contained in the range of 2 to 60 mol %, and preferably 8 to 25 mol %, relative to all the polyatomic carboxylic acid components or all the polyatomic alcohol components. If this value becomes less than 2 mol %, a hydrophilic property is deteriorated. On the other hand, if this value exceeds 60 mol %, a water resisting property is deteriorated, and further, disadvantage is caused on formation of polymers.

As further components to be used for the polyatomic carboxylic acids, terephthalic acid, isophthalic acid, phthalic acid, phthalic anhydride, 2,6-naphthalene dicarboxylic acid, 1,4-cyclohexane dicarboxylic acid, adipic acid, sebacic acid, trimellitic acid, pyromellitic acid, dimer acid and itaconic acid, for example, may be cited. As polyatomic alcohol components, ethylene glycol, dipropylene glycol, 1,6-hexane diol, 1,4-cyclohexane dimethanol, xylene glycol, dimethylol propane, poly(ethylene oxide) glycol and poly (tetramethylene oxide) glycol, for example, may be cited. These components may be used in combination with hydroxy carboxylic acids such as p-hydroxy benzoic acid and p-(β-hydroxyethoxy) benzoic acid. The polyester resin is synthesized by a combination of the foregoing polyatomic carboxylic acid or its ester-formative derivative and the foregoing polyatomic alcohol or its ester-formative derivative in the known manner.

Further, it is preferable to add a crosslinking binder to the coating layer 20 so as to enhance a crosslink density of the coating layer 20 for strengthening the solvent resistance thereof. As the crosslinking binder, melamine type crosslinking agents, urea type crosslinking agents, epoxy type crosslinking agents and isocyanate type crosslinking agents, for example, are used singly or in combination. An adding amount of the crosslinking binder is normally set in the range of 1 to 20 parts by weight, based on 100 parts weight of the binder. If this value is unduly great, it is not preferable in view of recycling.

Further, the coating layer 20 may contain a lubricant. As concrete examples of the lubricant, monobasic fatty acids; silicone oils, typically dimethylsiloxane; fluorine type lubricants; mineral oils; hydrocarbons, typically α-olefin oligomer, n-paraffin and the like; animal oils and vegetable oils may be cited.

As concrete examples of them, the monobasic fatty acids, such as lauric acid, myristic acid, stearic acid, oleic acid, linolic acid, linolenic acid, behenic acid, erucic acid and elaidic acid, and the fatty acid esters, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, butoxyethyl stearate, 2-ethylhexyl stearate and trimethylol propane trioleate, may be cited. These compounds have been widely available as lubricants. It is preferable that an adding amount of the lubricant is normally set in the range of 0.1 to 30 parts by weight, based on 100 parts weight of the coating formation. Naturally, those lubricants may be used singly or in combination.

On the coating layer 20 is formed the magnetic layer 30. The magnetic layer 30 contains, as main components, magnetic powder, a binder and an abrasive. A thickness of the magnetic layer is set in the range of 0.05 to 1.0 μm, preferably 0.08 to 0.7 μm, and more preferably 0.1 to 0.5 μm. If this value becomes less than 0.05 μm, the magnetic layer can not be formed uniformly according to the current coating technique so that a large thickness variation is caused. On the other hand, if this value exceeds 1.0 μm, lowering of the output is caused at a shorter wave length, and further, durability is deteriorated due to sinking of the abrasive caused by a calendering treatment. For preventing this, it is necessary to increase an adding amount of the abrasive, while this causes lowering of an electromagnetic transducer property.

The abrasive to be contained in the magnetic layer has an average particle size set in the range of 0.05 to 0.8 μm, preferably 0.08 to 0.5 μm, and more preferably 0.1 to 0.3 μm, and further satisfies conditions identified by the following equations (1) and (2):

$$d_{mx} \leq (d_{av} \times 2.0) + 0.5 \qquad \text{equation (1)}$$

$$d_{mx} \leq (t_c + t_m) + 0.5 \qquad \text{equation (2)}$$

wherein $d_{mx}$ represents a maximum particle size of the abrasive, $d_{av}$ represents an average particle size of the abrasive, $t_c$ represents a thickness of the coating layer 20, and $t_m$ represents a thickness of the magnetic layer 30, and wherein the unit of $d_{mx}$, $d_{av}$, $t_c$ and $t_m$ is μm.

In this preferred embodiment, the average particle size dav and the maximum particle size $d_{mx}$ are defined as follows:

Specifically, the average particle size $d_{av}$ is determined by measuring a maximum length of each of the particles and then deriving the arithmetic mean of the measured maximum lengths. On the other hand, the maximum particle size $d_{mx}$ is determined in the following fashion: A maximum length of each of the particles is measured, and then a particle size distribution, that is, a distribution of the measured maximum lengths, is derived. The maximum particle size $d_{mx}$ is determined by a value of a particle size corresponding to a position of the derived particle size distribution where the number of the measured maximum lengths is cut by 5% from the larger side. As a specific measuring method, photographs of sections of the magnetic recording medium are taken, and then, 100 or more abrasive particles are sampled arbitrarily from those in the photographs. Thereafter, the maximum length of each of the sampled particles is measured so that the average particle size $d_{av}$ and the maximum particle size $d_{mx}$ are derived in the foregoing calculation fashion.

If the average particle size of the abrasive becomes less than 0.05 μm, dispersion of the coating material can not be achieved sufficiently. On the other hand, if this value exceeds 0.8 μm or if the foregoing equations (1) and (2) are not satisfied, a gap between the magnetic layer and the magnetic head is increased due to the influence of the abrasive so that lowering of the output becomes significant at the shorter wave range.

As concrete examples of the abrasive, inorganic powder, such as metals, metal oxides, metal carbonates, metal sulfates, metal nitrides, metal carbides and metal sulfides may be cited.

More specifically, α-alumina, β-alumina, γ-alumina, θ-alumina, δ-alumina, dichromium trioxide, α-iron oxide, γ-iron oxide, goethite, $SiO_2$, ZnO, $TiO_2$, $ZrO_2$, $SnO_2$, silicon nitride, boron nitride, silicon carbide, titanium carbide, molybdenum carbide, boron carbide, tungsten carbide, calcium carbonate, barium carbonate, strontium carbonate, magnesium carbonate, barium sulfate, zinc sulfide, molybdenum disulfide, tungsten disulfide, and man-made diamond, for example, may be used singly or in combination.

The abrasive is normally used in an amount in the range of 0.1 to 20% by weight, preferably 0.5 to 15% by weight, and more preferably 1 to 10% by weight, relative to the magnetic powder. The abrasives enumerated above may be used singly or as properly combined in two or more kinds, to suit the properties expected of the magnetic layer. If two or more kinds are mixed, it is necessary that the mixture satisfies the foregoing ranges.

The foregoing abrasive is not always required to have an assay of 100%. If the main component is no less than 70%, the effect is not reduced.

It is further necessary that the abrasive hardly contains water-soluble ions of alkali metals, alkaline earth metals, chlorine, sulfuric acid, and nitric acid only in a minute amount. If these ions are contained therein in an unduly large amount, the excess ions will exert adverse effects on the storage properties of the produced magnetic recording medium.

The magnetic layer 30 contains the magnetic powder. As concrete examples of the magnetic powder to be used for the magnetic coating material, magnetic iron oxide powder, ferromagnetic metal powder, plate hexagonal ferrite, and chromium dioxide may be cited. Of these, it is preferable to use the ferromagnetic metal powder and the plate hexagonal ferrite.

As concrete examples of the ferromagnetic metal powder, Fe, Ni, Co, and alloys thereof may be cited. When those compounds which have as main components thereof such ferromagnetic metal elements as α-Fe, Fe—Co, Fe—Ni, Fe—Co—Ni, Co, and Co—Ni are used, they appropriately contain 70% and over, preferably 75% and over, by weight of a metal (Fe, Co, or Ni) or an alloy thereof. In the case of a magnetic powder of ferromagnetic metal which has Fe as a main component and further contains at least Co, normally, the amount of the Co atom is appropriately in the range of 5 to 40%, preferably 6 to 35%, by weight based on the amount of the Fe atom. Advantageously, a ferromagnetic metal powder which has Fe and/or Co as a main component additionally contain rare earth elements including Y. Optionally, such a ferromagnetic metal powder as mentioned above may be particles having the surface thereof coated with an oxide layer, partially carbonized or nitrided particles, or particles having the surface thereof coated with a carbonaceous layer. This ferromagnetic metal powder may contain a small amount of a hydroxide or an oxide. The ferromagnetic metal powder to be used in this invention can be obtained by any of the well-known methods such as, for example, a method which comprises reducing an organic acid salt (mainly oxalic acid salt) of a ferromagnetic metal with such a reducing gas as hydrogen, a method which comprises reducing with such a reducing gas as hydrogen either hydrated iron oxide or iron oxide obtained by heating hydrated iron oxide, a method which comprises thermally decomposing a metal carbonyl compound, a method which comprises reducing the aqueous solution of a ferromagnetic alloy by the use of such a reducing agent as sodium boron hydride, a hypophosphite, or hydrazine, and a method which comprises vaporizing a metal in an inert gas kept at a lowered pressure thereby converting it into a fine powder. Optionally, the ferromagnetic metal powder thus obtained may be subjected, prior to use, to any of the well-known methods for gradual oxidation such as, for example, a method which comprises soaking the powder in an organic solvent and then drying the wet powder, a method which comprises soaking the powder in an organic solvent, blowing an oxygen-containing gas into the bath thereby coating the surface of particles of the powder with an oxide film, and then drying the wet powder, and a method which comprises forming an oxide layer on the surface of particles of the powder by adjusting the partial pressures of oxygen gas and an inert gas without using an organic solvent.

The platelet hexagonal ferrite is a ferromagnetic powder consisting of hexagonal plates whose axes of easy magnetization lie perpendicularly to the relevant plates. As concrete examples of the platelet hexagonal ferrite, Ba-ferrite, Sr-ferrite, Pb-ferrite, Ca-ferrite, ferrites substituted by a metallic atom possessing a valency equaling the total of valencies of relevant Fe atoms, and hexagonal Co powder. More specifically, magneto-plumbite type Ba-ferrite and Sr-ferrite and such magneto-plumbite type Ba-ferrite and Sr-ferrite as partially contain a spinel phase may be cited. Such ferrites as are substituted by a metallic atom possessing a valency equaling the total of valencies of relevant Fe atoms for the purpose of controlling the coercive force of Ba-ferrite or Sr-ferrite prove particularly advantageous. The metallic atoms appropriately usable for the substitution which is aimed at controlling the coercive force include Co—Ti, Co—Ti—Sn, Co—Ti—Zr, Cu—Zn, Cu—Ti—Zn, Ni—Ti—Zn, etc., for example. When the Ba-ferrite is used, the term "plate diameter" refers to the width of the individual hexagonal plate-like particles of the powder and it is measured with the aid of an electron microscope. The plate diameter is in the approximate range of 0.01 to 0.1 μm and the plate thickness is normally in the approximate range of ½ to 1/20 of the diameter.

All the ferromagnetic powders mentioned above are allowed to incorporate therein a small amount of any of such elements as Al, Si, Cr, Mn, Co, Ni, Zn, Cu, Zr, Ti, Bi, Ag, Pt, B, C, P, N, Y, S, Sc, V, Mo, Rh, Pd, Ag, Sn, Sb, Te, Ba, Ca, Ta, W, Re, Au, Hg, Pb, La, Sr, and rare earth elements. The incorporation of Al, Si, P, Y, or a rare earth element, among other elements cited above, brings about the effect of improving particle size distribution and preventing the phenomenon of sintering.

These ferromagnetic powders may be coated with a layer of Al, Si, P, or an oxide thereof or may be given a surface treatment with a coupling agent such as Si, Al, or Ti or with a varying surfactant.

Some, if not all, of the ferromagnetic metal powders contain such a water-soluble inorganic ion as Na, K, Ca, Fe, or Ni. Usually, the content of the inorganic ion is appropriately 500 ppm and less.

These ferromagnetic powders may be treated, prior to dispersion, with a dispersant, a lubricant, a surfactant, an antioxidant, etc. which will be more specifically described herein below.

The water content of the ferromagnetic powder is normally appropriately in the range of 0.1 to 2%. Preferably, it is optimized, depending on the kind of binding agent to be used.

The ferromagnetic powder usually has the pH value thereof optimized in the range of 4 to 12, preferably 6 to 10, by virtue of the combination thereof with the binder resin to be used.

The ferromagnetic powder usually has a specific surface area in the range of 25 to 100 m²/g, preferably 40 to 85 m²/g, as determined by the BET (Brunauer-Emmett-Teller) method. If the specific surface area is less than 25 m²/g, the magnetic recording medium to be produced will suffer from unduly high noise. If it exceeds 100 m²/g, the magnetic recording medium will not easily acquire fully satisfactory surface property.

The ferromagnetic powder generally is contained in an amount in the range of 100 to 2,000 parts by weight, based on 100 parts by weight of the binder. The content of the magnetic powder in the magnetic layer is in the range of 50 to 95 parts by weight, preferably 55 to 90 parts by weight, based on the total amount of the magnetic layer. If the content of the magnetic powder is unduly large, the magnetic layer will tend to incur defects such as unduly low durability because the amount of resin and other additives in the magnetic layer is decreased proportionately. If this content is unduly small, the magnetic layer will be unable to produce a high regenerating output.

The ferromagnetic powders enumerated above by way of example may be used either singly or in the form of a mixture of two or more members, for example a mixture Ba-ferrite and ferromagnetic metal powder.

The binder resins which are appropriately used in the magnetic layer 30 include thermoplastic resins, thermosetting or reactive resins, and electron beam-sensitive modified resins, for example. These resins are selected and used as combined optionally to suit the properties of the medium and the conditions of process of manufacture.

The thermoplastic resin has a softening temperature of 150° C. and less, an average molecular weight in the approximate range of 5,000 to 200,000, and a polymerization degree in the approximate range of 50 to 2,000. The thermosetting resin, the reactive resin, or the electron beam-sensitive modified resin has the same average molecular weight and polymerization degree as the thermoplastic resin and, when heated and/or irradiated with an electron beam after the steps of coating, drying, and calendering, undergoes such a reaction as condensation or addition and acquires an infinite molecular weight.

Among other combinations of these resins, such combinations of vinyl chloride type copolymers with polyurethane resin are used particularly advantageously.

Vinyl chloride type copolymers appropriately have a vinyl chloride content in the range of 60 to 95%, preferably 60 to 90%, by weight and an average polymerization degree in the approximate range of 100 to 500.

These vinyl chloride type copolymers contain a sulfuric acid group and/or a sulfo group as a polar group (hereinafter referred to as S-containing polar group). In the S-containing polar groups ($-SO_4Y$, $-SO_3Y$), Y may be H or an alkali metal. Particularly preferably, these groups are $-SO_4K$ and $-SO_3K$ which have K for Y. The vinyl chloride type copolymers under discussion may contain either or both of the S-containing polar groups. When both of them are contained, the ratio thereof may be arbitrary.

These S-containing polar groups are appropriately contained in an amount in the range of 0.01 to 10%. preferably 0.1 to 5%, by weight as S atoms in the molecule.

As polar groups, $-OPO_2Y$ group, $-PO_3Y$ group, $-COOY$ group (wherein Y stands for H or an alkali metal), amino group ($-NR_2$), or $-NR_3Cl$ (wherein R stands for H, methyl, or ethyl) may be contained, as occasion demands, besides the S-containing polar group.

Among other groups mentioned above, the amino group need not be used in combination with the aforementioned S and may be in a varying kind. A dialkylamino group (preferably having an alkyl of one to ten carbon atoms) proves particularly appropriate.

The amino group of this nature is generally obtained by means of amine modification. Specifically, it is obtained by dispersing or dissolving a copolymer of vinyl chloride with an alkylcarboxylic vinyl ester in such an organic solvent as an alcohol, adding to the resultant dispersion or solution an amine compound (such as primary, secondary, or tertiary amine as aliphatic amine, alicyclic amine, alkanol amine, or alkoxyalkyl amine) and an epoxy group-containing compound intended to facilitate saponification, and subjecting the reactants to saponification. The amino group-containing vinyl unit is contained in an amount in the range of 0.05 to 5% by weight and it may ultimately contain an ammonium base.

The resin skeleton which is bound by the S-containing polar group is a vinyl chloride type resin. It can be obtained by polymerizing vinyl chloride, a monomer containing an epoxy group, or optionally other monomer copolymerizable therewith in the presence of such a radical generator as potassium persulfate or ammonium persulfate which possesses an S-containing strong acid radical. The amount of the radical generating agent to be used is generally in the range of 0.3 to 9.0%, preferably 1.0 to 5.0%, by weight based on the amount of the monomer. Since the present polymerization system is mostly soluble in water, the polymerization is appropriately carried out in the form of emulsion polymerization, suspension polymerization using such an alcohol as methanol as a polymerization medium, or solution polymerization using a ketone as a solvent.

The polyurethane resin which is used in combination with such a vinyl chloride type resin as mentioned above has the advantage of particularly excelling in wear resistance and adhesiveness to a substrate. It appropriately contains a polar group or a hydroxyl group in the side chain thereof. A polyurethane resin which possesses a polar group containing sulfur or phosphorus proves particularly appropriate.

The polyurethane resin is the general term for those resins which are obtained by the reaction of hydroxy group-containing resins such as polyester polyols and/or polyether polyols with a polyisocyanate-containing compound. The resin results from the polymerization of such synthetic raw materials as will be more fully described herein below until a number average polymer weight reaches a level in the approximate range of 500 to 200,000. The 0 value (weight average molecular weight (Mw)/number average molecular weight (Mn)) of the resin is in the approximate range of 1.5 to 4.

The polyurethane resin appropriately contains at least two species of polyurethane resin having glass transition points, Tg, differing from each other and yet falling in the range, $-20°$ C.$\leq$Tg$\leq 80°$ C. in a combined amount in the range of 10 to 90% by weight, based on the amount of the binder resin. The use of the plurality of species of polyurethane resin has the advantage of manifesting running stability, calender formability, and electromagnetic transducer properties in balanced magnitudes.

The vinyl chloride type copolymer and the urethane resin containing an S- and/P-containing polar group are advantageously used as combined at a gravimetric ratio in the range of 10:90 to 90:10.

These resins are allowed to contain additionally any of various known resins in an amount of not more than 20% by weight, based on the total amount of the resins.

As concrete examples of the polar group which is contained in the urethane resins mentioned above, S-containing groups such as $-SO_3M$ and $-SO_4M$, P-containing polar groups such as $=PO_3M$, $=PO_2M$, $=POM$, $-P=O(OM1)(OM2)$, and $-OP=O(OM1)(OM2)$, $-COOM$, $-NR_4X$ (wherein M, M1, and M2 independently stand for H, Li, Na, K, $-NR_4$, or $-NHR_3$, R stands for an alkyl group or H, and X stands for a halogen atom), $-OH$, $-NR_2$, $-N^+R_3$ (wherein R stands for a hydrocarbon group), epoxy group, $-SH$, and $-CN$ may be cited. At least one polar group selected from the group consisting of the polar groups enumerated above is appropriately incorporated in the resin by means of copolymerization or addition reaction. As the substituent M, Na is used particularly advantageously. The polar group is appropriately contained in the resin in an amount in the range of 0.01 to 10%, preferably 0.02 to 3%, by weight as atoms in the molecule. This polar group may be present in the main chain or in the branch of the skeleton resin.

The urethane resin under discussion is obtained by causing a specific polar group-containing compound and/or a raw material containing a raw material resin resulting from the reaction with a specific polar group-containing compound to react in the presence or absence of a solvent in accordance with the known method.

As concrete examples of the other thermoplastic resin, (meth)acrylic resin, polyester resins, acrylonitrile-butadiene type copolymers, polyamide resin, polyvinyl butyral, nitrocellulose, styrene-butadiene type copolymers, polyvinyl alcohol resin, acetal resin, epoxy type resins, phenoxy type resins, polyether resin, polycaprolactone and other polyfunctional polyethers, polyamide resin, polyimide resin, phenol resin, polybutadiene elastomer, chloride rubber, acryl rubbers, isoprene rubber, and epoxy-modified rubbers may be cited.

As concrete examples of the thermosetting resin, phenol resin, epoxy resin, polyurethane curing type resin, urea resin, butyral resin, formal resin, melamine resin, alkyd resin, silicone resin, acryl type reaction resin, polyamide resin, epoxy-polyamide resin, saturated polyester resins, and urea formaldehyde resin may be cited.

In the copolymers mentioned above, those which possess a hydroxyl group at a terminal or in a side chain are favorably used as reaction type resins because they allow easy use of crosslinkage with an isocyanate or modification by electron beam cross-linkage. The copolymers may contain acidic polar groups and basic polar groups like $-COOH$, $-SO_3M$, $-OSO_3M$, $-OPO_3X$, $-PO_3X$, $-PO_2X$, $-N^+R_3Cl^-$, and $-NR_2$ as polar groups at a terminal or in a side chain. The incorporation of these additional polar groups has the advantage of improving the dispersibility.

These polar groups may be used either single or in the form of a combination of two or more members.

Various polyisocyanates can be used as a hardening agent for hardening a binder resin. A hardening agent obtained by converting at least one member selected from the group consisting of tolylene diisocyanate, hexamethylene diisocyanate, and methylene diisocyanate into trimethylol propane which possesses a plurality of hydroxyl groups or into an isocyanurate type hardening agent having three molecules of diisocyanate compound bound therein is advantageously used. The content of the hardening agent is appropriately in the range of 1 to 50% by weight, based on 100% by weight of the resin. This hardening agent is three-dimensionally bound with the hydroxyl group contained in the binder resin to improve the durability of the coating layer.

The concrete commercially available products include Coronate L, Coronate HL, Coronate 3041 and Coronate 2023 marketed by Nippon Polyurethane K.K.; 24A-100 and TPI-100 marketed by Asahi Chemical Industry Co., Ltd.; and Desmodule L and Desmodule N marketed by BF Goodrich Corp., for example.

Generally, the reactive or thermosetting resin is hardened by heating the resin in an oven at a temperature in the range of 50 to 80° C. for a period in the range of 6 to 100 hours or by passing the resin at a low speed through the interior of an oven at a temperature in the range of 80 to 120° C.

The copolymer may be modified, prior to use, by the well-known method so as to incorporate therein a (meth) acrylic type double bond and acquire sensitivity to the electron beam. As means to effect the modification for the impartation of electron beam sensitivity, the method of urethane modification which comprises causing the copolymer to react with an adduct of tolylene diisocyanate (TDI) with 2-hydroxyethyl (meth)acrylate (2-HEMA), the improved method of urethane modification which involves use of a monomer (such as, for example, 2-isocyanate ethyl(meth)acrylate) which contains at least one ethylenically unsaturated double bond and one isocyanate group in the molecule, and containing no urethane bond in the molecule, and the method of ester modification which comprises causing a resin possessing a hydroxyl group or a carboxylic acid group to react with a compound possessing a (meth)acryl group and a carboxylic anhydride or a dicarboxylic acid have been well known in the art. Among other methods, the improved method of urethane modification has the particular advantage of allowing an addition to the content of the vinyl chloride type resin without developing brittleness and permitting production of a coating excelling in dispersing property and surface properties. The content of the electron beam functional group is appropriately in the range of 1 to 40 mol %, preferably 10 to 30 mol %, in the hydroxyl group component from the standpoint of the stability in the process of production and the electron beam curing property. Particularly in the case of a vinyl chloride type copolymer, when the relevant monomers are so used in the reaction as to effect incorporation in the produced copolymer of 1 to 20, preferably 2 to 10, functional groups per molecule, the electron beam-cured resin consequently obtained excels in both dispersing property and hardening property.

The term "acryl type double bond" as used herein refers to a (meth)acryloyl group which is the residue of (meth)acrylic acid, (meth)acrylic esters, and (meth)acrylic acid amides.

The electron beam sensitive resin, prior to use, is allowed to incorporate therein 1 to 50% by weight of the well-known polyfunctional acrylate for the purpose of improving the ratio of cross-linkage.

As the source of radiation for the curing of the coating material using the electron beam sensitive modified resin as a binder, an electron beam and/or an ultraviolet light is used advantageously from the viewpoint of facilitating the control of the amount of radiation absorbed, the introduction of the radiation into the line of production process, and the shielding of an operation in process against an ionizing radiation. In the case of the electron beam, it is advantageous to adopt an electron beam accelerator having an acceleration voltage in the range of 100 to 750 KV, preferably 150 to 300 KV and operate this electron beam accelerator so that the amount of radiation to be absorbed is in the range of about 20 to 200 k-gray.

In the case of the electron beam cross-linkage, it is important that the electron beam be irradiated in an ambience of such an inert gas as $N_2$, He, or $CO_2$ having an oxygen content of 1% and less. This condition is intended to prevent the $O_3$ produced in consequence of the irradiation from sequestering a radical.

When the ultraviolet light is used, the binder containing the electron beam curing resin incorporates therein a well-known photopolymerization sensitizer. It can be effectively irradiated by the use of such an ultraviolet light tube as a xenon discharge tube or a hydrogen discharge tube.

The solvent to be contained in the magnetic coating material for forming the magnetic layer 30 has no particular limit. It is properly selected in due respect of such factors as the solubility and compatibility of the binder resin, and drying efficiency of the binder. As concrete examples of the solvent, ketones such as methylethyl ketone, methylisobutyl ketone, and cyclohexanone, aromatic hydrocarbons such as toluene and xylene, esters such as ethyl acetate and butyl acetate, alcohols such as isopropanol and butanol, chlorine-substituted hydrocarbons, dioxane, tetrahydrofuran, dimethyl formamide, and hexane, and other similar diluents and solvents may be cited. These solvents can be used either singly or in the form of a mixture of two or more members.

The organic solvent is not always required to have an assay of 100%. It may contain such impurities as isomers, unaltered reactants, by-products, decomposed substances, oxides, and moisture. The total content of these impurities must be 5% and less, preferably 3% and less, by weight. If the content of impurities is unduly large, the excess impurities will exert adverse effects on the dispersibility of the magnetic powder, the storageability of the coating material, the hardening properties of the magnetic layer, and the storage properties of the medium.

The solvent is appropriately used in an amount in the range of 10 to 10000%, preferably 100 to 5000%, by weight based on the total amount of the binder so that the viscosity of the produced coating material determined at the stage of application to a substrate by the use of a corn plate type or a double-cylinder type viscosimeter at a shear rate of 3000 $sec^{-1}$ falls in the range of 5 to 100 cps. The ratio of the amount of the solvent to the whole amount of the coating material is appropriately in the approximate range of 5 to 40%, preferably 10 to 35%, by weight as solids (nonvolatile substances) concentration. The kind, the mixing ratio, and the amount of this solvent to be used ought to be determined in due consideration of the kind, specific surface area, particle size, amount of magnetization, volume or weight degree of filling of the pigment used in the coating material, and the dilution stability of the coating material so that the viscosity of the coating material falls in the range mentioned above.

The addition of the solvent is advantageously carried out stepwise along the component steps of the process of production of the coating material. Otherwise, it may be sequentially added as stirred at a fixed flow volume into the tank or it may be gradually mixed with the coating material in the pipe leading to the site of application to a substrate. When the solvent is added to the coating material or when the coating material is diluted with the solvent, the coating material is appropriately subjected to a treatment of filtration and/or dispersion when permissible. This treatment is effective in stabilizing the coating material and repressing the occurrence of agglomeration and foreign matter.

The magnetic coating material generally contains a lubricant. In the various known lubricants, a fatty acid and/or a fatty ester is used particularly advantageously. As concrete examples of the fatty acid, monobasic fatty acids of 12 to 24 carbon atoms (which may contain an unsaturated bond or a branch) may be cited. As concrete examples of the fatty ester, monofatty esters, difatty esters, and trifatty esters formed to react monobasic fatty acids of 10 to 24 carbon atoms (which may contain an unsaturated bond or a branch) with one of alcohols such as cyclic or polysaccharide reduced alcohols (such as sorbitans and sorbitols), monovalent, divalent, trivalent, tetravalent, pentavalent, and hexavalent alcohols having 2 to 22 carbon atoms (which may contain an unsaturated bond or a branch) may be cited. These lubricants may be used either singly or in the form of a mixture of two or more members.

As concrete examples of the monobasic fatty acid, lauric acid, myristic acid, stearic acid, oleic acid, linolic acid, linolenic acid, behenic acid, erucic acid, and elaidic acid may be cited. As concrete examples of the fatty ester, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate may be cited.

The effect of such a fatty acid and/or a fatty ester as a lubricant or dispersant is manifested by having the acid and/or ester incorporated in the magnetic coating material in a total amount of 0.1% and over by weight based on the amount of the fine ferromagnetic powder. The conspicuity of this effect grows in proportion as the total content of this acid and/or ester increases. If this total content is more than 20% by weight based on the amount of the fine ferromagnetic powder, the excess lubricant or dispersant will not remain fast within the magnetic layer but exude to the surface of the magnetic layer possibly to the extent of exerting adverse effects of smearing the magnetic head and lowering the output of the recording medium.

The total content of the fatty acid and/or fatty ester in the magnetic layer, therefore, is appropriately in the range of 0.1 to 20%, preferably 1 to 15%, more preferably 1 to 12%, by weight based on the amount of the fine ferromagnetic powder.

Further, when the magnetic recording medium has a backcoat layer, the lubricant may be incorporated more in the backcoat layer side of the recording medium with the hope of enhancing the lubricity of the surface of the magnetic layer owing to the transfer of the lubricant from the backcoat layer to the magnetic layer.

The fatty acid and/or the fatty ester need not always have an assay of 100% but may contain such impurities as isomers, unaltered reactants, by-products, decomposed substances, and oxides. The total content of these impurities is appropriately 40% and less, preferably 20% and less.

The additives including the fatty acid and the fatty ester to be used herein may be wholly or partly added to the coating material in process at any of the component steps of the process for the manufacture of the magnetic recording medium. This addition is implemented, for example, by the additives being mixed with the pigment powder prior to the step of kneading, added during the step of kneading of the pigment powder and the binder with the aid of a solvent, added at the step of dispersion, added subsequent to the step of dispersion, added immediately before the step of application to a substrate, or a solution on dispersion of additives coated on a magnetic layer formed in advance.

The magnetic coating material for forming the magnetic layer 30 generally incorporates therein additives capable of manifesting a lubricating effect, an antioxidant effect, a dispersing effect, a plasticizing effect, etc. As concrete examples of the additives, silicone oils, fluorine oil, fluorine-substituted hydrocarbon-containing alcohols, fatty acids, esters, and ethers, paraffins, metal (Li, Na, K, Ca, Ba, Cu, Pb, etc.) salts of such monobasic fatty acids as mentioned above, alcohols for the production of such fatty esters as mentioned above, alkoxy alcohols, fatty esters of polyethylene oxide-added monoalkyl ethers, aliphatic or cyclic amines, fatty acid amides, quaternary ammonium salts, polyolefins, polyglycols, polyphenyl ethers, fluorine-containing alkyl sulfuric esters and alkali metal salts thereof, alkylene oxide type, glycerin type, glycidol type, and alkylphenol ethylene oxide-added type nonionic surfactants, cationic surfactants such as phosphonium and sulfonium and alkali metal salts thereof, anionic surfactants containing such acidic groups as carboxylic acid group, sulfonic acid group, phosphoric acid group, sulfuric ester group, and phosphoric ester group and alkali metal salts thereof, and amphoteric surfactants such as amino acids, aminosulfonic acids, sulfuric or phosphoric esters of amino alcohols, and alkyl betaines may be cited.

These surfactants are described in detail in the "Surfactant Handbook" published by Sangyo Tosho K.K.

The amount of such a surfactant to be incorporated in the magnetic coating material is appropriately 10% and less, preferably in the range of 0.01 to 5%, by weight based on the amount of the magnetic powder. In the absence of the magnetic powder, this amount is properly in the range of 0.005 to 50% by weight based on the amount of the binder.

The magnetic coating material may further incorporate therein an inorganic compound. As concrete examples of the inorganic powder to be used for this purpose, metals, metal oxides, metal carbonates, metal sulfates, metal nitrides, metal carbides, and metal sulfides each in the form of a powder may be cited.

The magnetic coating material may further incorporate therein carbon black. As concrete examples of the carbon black to be used herein, furnace carbon black, thermal carbon black, and acetylene black may be cited. The particle size and other similar factors of the carbon black may be arbitrarily set. To be specific, they may be properly selected to consider the balance of magnitudes of the electric resistance, friction properties, and the output at the shortest recording wavelength (surface roughness). The species of carbon black mentioned above may be used either singly or in the form of a mixture of two or more members. The aforementioned factors may be selected independently for the species of carbon black to be selected. The average particle diameter of the carbon black is properly in the range of 10 to 400 nm, preferably 20 to 350 nm. More specifically, in the range of 20 to 40 nm when the electromagnetic transducer properties are taken into account preferentially. In case of considering the friction, the largest possible particle diameter allowable for the sake of the electromagnetic transducer properties may be selected in the range of 40 to 350 nm. In the selection of carbon black, not only the particle size but also the BET value and the DBP value (dibutyl phtharate adsorption value) must be taken into account. Since the particle size, BET value, and DBP value of carbon black are so closely related to one another as to render it infeasible to set these factors at independent and mutually remote magnitudes, the three factors must be empirically selected based on the properties expected of the recording medium and the dispersion properties and the flow properties of the coating material.

The carbon black is used in an amount in the range of 10 to 500% by weight based on the amount of the binder or in the range of 0.1 to 20% by weight based on the amount of the magnetic powder. These gravimetric ratios of the amount of carbon black must be empirically selected based on the properties expected of the recording medium and the dispersion properties and flow properties of the coating material. The species of carbon black are used as properly combined to suit the properties expected of the magnetic layer, the backcoat layer, and the undercoating layer. The carbon black may be added at the time that it is kneaded with or dispersed in the magnetic powder. Otherwise, it may be dispersed in advance in the binder and then added at the time that it is dispersed in the magnetic coating material.

The carbon black may be subjected to a surface treatment using a lubricant or a dispersant. Otherwise, it may have part of the surface of its particles graphitized prior to use. For information on the carbon black which can be used in this invention, the "Carbon Black Nenkan" compiled by Carbon Black Society can be consulted.

The magnetic coating material may further incorporate therein a non-ferromagnetic organic powder. As concrete examples of the non-ferromagnetic organic powder to be used herein, acryl-styrene type resin powder, benzoguanamine resin powder, melamine type resin powder, phthalocyanine type pigment, azo type pigment, polyolefin type resin powder, polyester type resin powder, polyamide type resin powder, polyimide type resin powder, hydrocarbon fluoride resin powder, and divinyl benzene type resin powder may be cited. This non-ferromagnetic organic powder is used in an amount in the range of 0.1 to 20% by weight, based on the amount of the binder.

For the coating of the magnetic coating material on the substrate, a method of extrusion nozzle coating, a method of reverse roll coating, a method of gravure roll coating, a method of doctor blade coating, a method of kiss coating, a method of collar coating, and a method of slide bead coating can be utilized. Among other methods mentioned above, the method of gravure roll coating excels in productivity and the method of reverse roll coating has the advantage of being adoptable for a wide range of coating materials. The method of extrusion nozzle coating is at an advantage in allowing simultaneous multilayer coating. In these three particularly favorable methods, the method of extrusion nozzle coating stands out in point of controlling the thickness of an applied layer easily.

The magnetic coating material which has been applied on the substrate by such a method as described above (to form a so-called magnetic layer), is subjected to a treatment for the orientation of a magnetic field, a drying treatment, or a surface smoothing treatment. As the smoothing treatment for the magnetic layer, the calendering treatment is used. The calendering treatment may use rolls in combination (3 to 7 stage combination) of heat-resisting plastic rolls made of epoxides, polyesters, nylons, polyamides, polyimides, polyamideimides or the like (which may be mixed with inorganic compound like carbon and metal) and metal rolls, or in combination of metal rolls. A treatment temperature is set preferably no less than 70° C., and more preferably no less than 80° C., a linear pressure is set to preferably no less than 200 kg/cm, and more preferably no less than 300 kg/cm, and a treatment speed is set in the range of 20 to 700 m/min. Then, the laminate consequently obtained is cut into strips of a prescribed shape, for example, to achieve the magnetic recording media.

In this preferred embodiment, if necessary, between the substrate 10 and the coating layer 20 may be interposed an intermediate layer in which a particle size and an adding amount of the nonmagnetic particles are controlled, or a resin layer having a low glass-transition temperature (Tg). With this arrangement, it is possible to expect improvement in uniformity of the surface roughness or in effect of the calendering treatment.

Further, the magnetic recording medium 1 may have one of various known backcoat layers on a reverse side of the substrate 10 (the side not covered by the magnetic layer).

Now, the present invention will be described in further detail with reference to specific examples of the invention.

EXAMPLE 1

Production of Flexible Substrate 10

An ethylene glycol slurry containing $SiO_2$ particles was prepared and reacted with dimethyl terephthalate for transesterification so as to produce, through polycondensation, a chip of polyethylene terephthalate (PET) containing a given amount of $SiO_2$ particles. This chip was dried under reduced pressure at 180° C. for 3 hours and then supplied to an extruder for melting at 300° C. The extruded polymer was wound around a casting drum held at a surface temperature of 30° C. to be cooled to solidify, using the electrostatic casting method. In this fashion, a amorphous film of the thermoplastic polymer was produced. Thereafter, this non-stretched film was stretched (or oriented) 3.5 times longer in a longitudinal direction thereof at 80° C., using a circumferential roll speed difference.

Formation of Coating Layer 20

The coating layer 20 was applied on the thus produced PET flexible substrate 10 and subjected to a stretching (or orientation) treatment in the following fashion. Specifically, organic particles (styrene-ethylene glycol dimethacrylate) having an average particle size of 40 nm (0.04 μm) were contained in water-soluble polyester resin at 40% by weight and dispersed so as to obtain an aqueous solution. The aqueous solution was applied on the substrate 10 by means of a bar coater, and then, this uniaxial stretched (or oriented) film was stretched 4.0 times longer in a width direction thereof at 90° C., using the tenter method. Drying of the coating layer 20 was performed simultaneously with the lateral stretching, that is, stretching the film in the width direction. Further, the film was again stretched 1.6 times longer in the longitudinal direction thereof at 110° C., using a circumferential roll speed difference. Thereafter, while holding the constant length, the film was heat-treated at 220° C. for 5 seconds to obtain a biaxial oriented polyester film having a total thickness of 5.5 μm and a thickness (drying) of the coating layer of 0.05 μm.

Formation of Magnetic Layer 30

The magnetic layer 30 as noted below was formed on the thus obtained polyester film at a side of the coating layer 20.

A magnetic coating material for the formation of the magnetic layer was prepared with the following composition including magnetic powder of ferromagnetic metal (Fe/Co/Al/Y=100/20/4.2/5.3 (weight ratio)) having Hc=2000 Oe, $\sigma_s$=140 emu/g, an average length of major axis 0.08 μm, and an average ratio of axes 5.

Composition of Magnetic Coating Material for Formation of Magnetic Layer

| | |
|---|---|
| Magnetic powder of ferromagnetic metal | 100 parts by weight |
| Vinyl chloride type copolymer (produced by Nippon Zeon K.K. and marketed under product code of "MR-110") | 8.3 parts by weight |
| Polyester polyurethane resin (produced by Toyobo Co., Ltd. and marketed under product code of "UR-8300") | 8.3 parts by weight |
| α-alumina | 5 parts by weight |
| Stearic acid | 1 part by weight |
| Butyl stearate | 1 part by weight |
| Methylethyl ketone | 111 parts by weight |
| Toluene | 111 parts by weight |
| Cyclohexanone | 74 parts by weight |

Part or the whole of this composition was given a thorough kneading treatment in a kneader and dispersed, mixed and diluted by means of a sand grinder mill. The magnetic coating material thus obtained and 3.3 parts by weight of a hardening agent (produced by Nippon Polyurethane Kogyo K.K. and marketed under trademark designation of "Coronate L") added thereto were mixed and the resultant mixture was applied on the foregoing PET film substrate 10 (at a side of the coating layer 20) having 5.5 μm in thickness by means of the method of nozzle coating so as to provide the magnetic layer having 0.2 μm in thickness (drying). Then, the magnetic layer was given an orienting treatment in the magnetic field, dried and subjected to a calendering treatment. Meanwhile, the following backcoat composition and 2 parts by weight of a hardening agent (produced by Nippon Polyurethane Kogyo K.K. and marketed under trademark designation of "Coronate L") added thereto were mixed and the resultant mixture was applied to the other side of the PET film substrate 10 (the side not covered by the magnetic layer). Then, the resultant backcoat layer was subjected to a calendering treatment and a thermosetting treatment. Thereafter, the resultant laminate was cut into strips of 8 mm in width to produce samples of the magnetic recording medium in the form of tapes (Example Sample 1).

Composition for Formation of Backcoat Layer

| | |
|---|---|
| Carbon black-1 having an average particle size of 21 nm and a BET value of 220 m²/g (produced by Columbian Carbon K.K. and marketed under trademark designation of "Conductex SC Ultra") | 80 parts by weight |
| Carbon black-2 having an average particle size of 350 nm and a BET value of 8 m²/g (produced by Columbian Carbon K.K. and marketed under trademark designation of "Sevcarb MT") | 1 part by weight |
| α-iron oxide having an average particle size of 0.1 μm (produced by Toda Kogyo K. K. and marketed under product code of "TF-100") | 1 part by weight |
| Vinyl chloride-vinyl acetate-vinyl alcohol copolymer having an average polymerization degree of 420 (produced by Nisshin Kagaku Kogyo K.K. and marketed under product code of "MPR-TA") | 40 parts by weight |
| Vinyl chloride-vinyl acetate-vinyl alcohol copolymer containing 390 ppm of nitrogen atoms and having an average polymerization degree of 340 (produced by Nisshin Kagaku Kogyo K.K. and marketed under product code of "MRR-ANO (L)") | 25 parts by weight |
| Polyester polyurethane resin containing —SO₃Na and having a number average molecular weight of 40000 (produced by Toyobo Co., Ltd. and marketed under product code of "TS9555") | 35 parts by weight |
| Methylethyl ketone | 700 parts by weight |
| Toluene | 400 parts by weight |
| Cyclohexanone | 300 parts by weight |

EXAMPLES 2–4

In Example 1, a thickness of the coating layer 20 was changed to various values as shown in Table 1. Except for this, samples of Examples 2–4 were prepared in the same manner as in Example 1.

EXAMPLES 5–9

In Example 3, a thickness of the magnetic layer 30 was changed to various values as shown in Table 1. Except for this, samples of Examples 5–9 were prepared in the same manner as in Example 3.

EXAMPLES 10–12

In Example 3, a particle size of the nonmagnetic particles contained in the coating layer 20 was changed as shown in Table 1. Except for this, samples of Examples 10–12 were prepared in the same manner as in Example 3.

EXAMPLES 13 and 14

In Example 3, an adding amount of the nonmagnetic particles contained in the coating layer 20 was changed as shown in Table 1. Except for this, samples of Examples 13 and 14 were prepared in the same manner as in Example 3.

EXAMPLE 15

In Example 3, the material of the base film formed the flexible substrate 10 and the coating layer 20 was changed as noted below. Except for this, samples of Example 15 were prepared in the same manner as in Example 3. Specifically, a base film including a flexible substrate and a coating layer was produced in the following fashion:

Production of Base Film

An ethylene glycol slurry containing $SiO_2$ particles was prepared and reacted with naphthalene-2,6-dimethyl dicarboxylate for transesterification so as to produce, through polycondensation, a chip of polyethylene naphthalate (PEN) containing a given amount of $SiO_2$ particles. Using this chip, a thermoplastic polymer was prepared. This polymer was dried under reduced pressure at 280° C. for 4 hours and then supplied to an extruder for melting at 295° C. The extruded polymer was wound around a casting drum so as to be cooled to solidify, using the electrostatic casting method. In this fashion, a non-stretched film of the thermoplastic polymer was produced. Thereafter, this non-stretched film was stretched (or oriented) 2.5 times longer in a longitudinal direction thereof at 145° C., using a circumferential roll speed difference.

The coating layer was applied on the thus produced flexible substrate and subjected to a stretched (or oriented) treatment in the following fashion. Specifically, organic particles (styrene-ethylene glycol dimethacrylate) having an average particle size of 40 nm (0.04 μm) were contained in water-soluble polyester resin at 40% by weight and dispersed so as to obtain an aqueous solution. The aqueous solution was applied on the flexible substrate by means of a bar coater, and then dried simultaneously with the lateral stretching. A thickness (drying) thereof was 0.2 μm.

This uniaxial stretched (or oriented) film was stretched (or oriented) 4.2 times longer in a width direction thereof at 135° C., using the tenter method, and then heat-fixed at 210° C. The heat-fixed film was again drawn 1.9 times longer in the longitudinal direction thereof at 160° C., using a circumferential roll speed difference. Thereafter, while holding the constant length, the film was heat-fixed at 220° C. for 5 seconds to obtain a biaxial oriented polyester film having a total thickness of 5.5 μm.

EXAMPLES 16–19

In Example 3, a thickness of the magnetic layer 30 and an average particle size and a maximum particle size of the abrasive contained in the magnetic layer were changed to various values as shown in Table 1. Except for this, samples of Examples 16–19 were prepared in the same manner as in Example 3.

EXAMPLE 20

In Example 3, a kind of the nonmagnetic particles contained in the coating layer 20 was changed to silica as shown in Table 1 (represented by symbol B in Table 1). Except for this, samples of Example 20 were prepared in the same manner as in Example 3.

EXAMPLE 21

In Example 3, an average particle size and a maximum particle size of the abrasive contained in the magnetic layer 30 were changed as shown in Table 1. Except for this, samples of Example 21 were prepared in the same manner as in Example 3.

EXAMPLE 22

In Example 21, a thickness of the magnetic layer 30 was changed as shown in Table 1. Except for this, samples of Example 22 were prepared in the same manner as in Example 21.

EXAMPLE 23

In Example 19, an average particle size and a maximum particle size of the abrasive contained in the magnetic layer 30 were changed as shown in Table 1. Except for this, samples of Example 23 were prepared in the same manner as in Example 19.

EXAMPLES 24–26

In Example 4, an average particle size and a maximum particle size of the abrasive contained in the magnetic layer 30 were changed as shown in Table 1. Further, a thickness of the magnetic layer 30 was also changed. Except for this, samples of Example 24–26 were prepared in the same manner as in Example 4.

EXAMPLES 27 and 28

In Example 3, an average particle size and a maximum particle size of the abrasive contained in the magnetic layer 30 were changed as shown in Table 1. Further, a thickness of the magnetic layer 30 was also changed. Except for this, samples of Examples 27 and 28 were prepared in the same manner as in Example 3.

EXAMPLE 29

In Example 3, a thickness of the magnetic layer 30 was changed as shown in Table 1. Except for this, samples of Example 29 were prepared in the same manner as in Example 3.

EXAMPLE 30

In Example 26, an average particle size and a maximum particle size of the abrasive contained in the magnetic layer 30 were changed as shown in Table 1. Except for this, samples of Example 30 were prepared in the same manner as in Example 26.

EXAMPLES 31–35

In Example 2, a particle size and an adding amount of the nonmagnetic particles contained in the coating layer 20 were changed as shown in Table 1. Except for this, samples of Examples 31–35 were prepared in the same manner as in Example 2.

EXAMPLE 36

In Example 3, an adding amount of the nonmagnetic particles contained in the coating layer 20 was changed as shown in Table 1. Except for this, samples of Example 36 were prepared in the same manner as in Example 3.

EXAMPLES 37 and 38

In Example 12, an adding amount of the nonmagnetic particles contained in the coating layer 20 was changed as shown in Table 1. Except for this, samples of Examples 37 and 38 were prepared in the same manner as in Example 12.

EXAMPLES 39 and 40

In Example 3, a kind of the nonmagnetic particles contained in the coating layer 20 was changed as shown in Table 1. Except for this, samples of Examples 39 and 40 were prepared in the same manner as in Example 3.

In Table 1, particles C represent styrene-divinyl benzene type organic particles, and particles D represent methyl methacrylate-divinyl benzene type organic particles.

EXAMPLE 41

Samples of the magnetic recording medium in the form of tapes according to this preferred embodiment were further prepared in the following fashion:

Production of Flexible Substrate 10 and Formation of Coating Layer 20

100 parts by weight of dimethyl terephthalate, 65 parts by weight of ethylene glycol and 0.09 parts by weight of magnesium acetate were put into a reactor which is heated to increase in temperature to achieve a transesterification while maintaining methanol. About 4 hours were required from the start of reaction to increasingly reach 230° C. where the ester interchange was substantially finished. Then, 0.3 parts by weight of $SiO_2$ particles having an average particle size of 0.1 μm were added as ethylene glycol slurry. Thereafter, 0.4 parts by weight of ethyl acid phosphate and 0.04 parts by weight of antimony trioxide were added, while reducing a pressure of the reaction system from a normal pressure and heating to increase a temperature to achieve the final conditions of 1 mmHg and 285° C. After 4 hours, the reaction system was returned to the normal pressure and polyethylene terephthalate (hereinafter referred to as "PET") having a limiting viscosity of 0.66 was obtained.

The thus obtained PET was dried at 180° C. for 4 hours and then supplied to an extruder for melting at 290° C. The extruded polymer was wound around a casting drum held at a surface temperature of 40° C. to be cooled to solidify, using the electrostatic casting method, so that a non-stretched sheet was produced.

This non-stretched sheet was stretched (or oriented) 2.6 times longer at 89° C., and further, 1.73 times longer at 80° C. in a longitudinal direction thereof, using the roll stretching (or orientation) method. Subsequently, the coating liquid with the same composition as that in Example 1 was applied thereon by means of a bar coater for forming the coating layer 20. The applied film was introduced into a tenter to achieve a stretching (or orientation) treatment of 3.2 times longer in a width direction at 120 to 145° C. Then, the film was heat-fixed at 220° C. for 10 seconds to obtain a biaxial stretched (or oriented) polyester film having a total thickness of 5.5 μm and a thickness (drying) of the coating layer of 0.2 μm.

Formation of Magnetic Layer 30

The coating material for the formation of the magnetic layer as in Example 1 was applied on the foregoing polyester film at a side of the coating layer 20, using the method of nozzle coating, so as to provide the magnetic layer having 0.2 μm in thickness (drying). Then, the magnetic layer was given an orienting treatment in the magnetic field, dried and subjected to a calendering treatment.

Meanwhile, the coating material for the formation of the backcoat layer as in Example 1 was applied to the other side of the foregoing polyester film (the side not covered by the magnetic layer). Then, the resultant backcoat layer was subjected to a calendering treatment and a thermosetting treatment. Thereafter, the resultant laminate was cut into strips of 8 mm in width to produce samples of the magnetic recording medium in the form of tapes (Example Sample 41).

COMPARATIVE EXAMPLE 1

In Example 1, a thickness of the coating layer 20 was changed to 0.03 μm as shown in Table 1. Except for this, samples of Comparative Example 1 were prepared in the same manner as in Example 1.

COMPARATIVE EXAMPLE 2

In Example 3, a thickness of the magnetic layer 30 was changed to 1.5 μm as shown in Table 1. Except for this, samples of Comparative Example 2 were prepared in the same manner as in Example 3.

COMPARATIVE EXAMPLES 3–6

In Example 1, the coating layer 20 was not provided. Further, a thickness of the magnetic layer 30 was changed to 1.5 μm, 0.2 μm, 0.7 μm and 1.0 μm. Except for this, samples of Comparative Examples 3–6 were prepared in the same manner as in Example 1.

COMPARATIVE EXAMPLE 7

In Example 3, an average particle size and a maximum particle size of the abrasive contained in the magnetic layer 30 were changed. Except for this, samples of Comparative Example 7 were prepared in the same manner as in Example 3. These samples do not satisfy the condition identified by the foregoing equations (1) and (2).

COMPARATIVE EXAMPLE 8

In Example 3, a thickness of the magnetic layer 30 and a maximum particle size of the abrasive contained in the magnetic layer 30 were changed. Except for this, samples of Comparative Example 8 were prepared in the same manner as in Example 3. These samples do not satisfy the condition identified by the foregoing equations (1) and (2).

COMPARATIVE EXAMPLE 9

In Example 3, the coating layer 20 was changed to an undercoating layer having the following coating material composition. This undercoating layer was simply dried after application on the flexible substrate and thus no stretching (or orientation) treatment was applied thereto. Except for this, samples of Comparative Example 9 were prepared in the same manner as in Example 3.

Coating Material Composition for Formation of Undercoating Layer

| | |
|---|---|
| Needle-state α-iron oxide having an average length of major axis of 0.15 μm and a BET value of 53 m$^2$/g | 100 parts by weight |
| Carbon black (produced by Columbian Carbon K.K. and marketed under trademark designation of "Conductex SC") | 25 parts by weight |
| Vinyl chloride type copolymer (produced by Nippon Zeon K.K. and marketed under product code of "MR-110") | 10 parts by weight |
| Polyurethane resin A (produced by Toyo Boseki Co., Ltd. and marketed under product code of "UR8200") | 5 parts by weight |
| Polyurethane resin B (produced by Toyo Boseki Co., Ltd. and marketed under product code of "UR8700") | 5 parts by weight |
| α-alumina (produced by Sumitomo Chemical Co., Ltd. and marketed under product code of "HIT60A") | 10 parts by weight |
| Stearic acid | 2 parts by weight |
| Butyl stearate | 1 part by weight |
| Methylethyl ketone | 80 parts by weight |
| Toluene | 80 parts by weight |
| Cyclohexanone | 80 parts by weight |

Part or the whole of this composition was given a thorough kneading treatment in a kneader and dispersed, mixed and diluted by means of a sand grinder mill. The coating material thus obtained was mixed with 3.6 parts by weight of a hardening agent (produced by Nippon Polyurethane Kogyo K.K. and marketed under trademark designation of "Coronate L") immediately before the application, and then applied.

COMPARATIVE EXAMPLE 10

In Example 3, a thickness of the coating layer 20 and a particle size and an adding amount of the nonmagnetic particles contained in the coating layer 20 were changed as shown in Table 1. Except for this, samples of Comparative Example 10 were prepared in the same manner as in Example 3.

COMPARATIVE EXAMPLE 11

In Example 21, a thickness of the coating layer 20 was changed as shown in Table 1. Except for this, samples of Comparative Example 11 were prepared in the same manner as in Example 21. These samples do not satisfy the condition identified by the foregoing equation (2).

COMPARATIVE EXAMPLE 12

In Example 4, an average particle size and a maximum particle size of the abrasive contained in the magnetic layer 30 were changed as shown in Table 1. Except for this, samples of Comparative Example 12 were prepared in the same manner as in Example 4. These samples do not satisfy the condition identified by the foregoing equation (1).

COMPARATIVE EXAMPLE 13

In Example 7, a thickness of the magnetic layer 30 was changed as shown in Table 1. Except for this, samples of Comparative Example 13 were prepared in the same manner as in Example 7. These samples do not satisfy the condition identified by the foregoing equations (1) and (2).

COMPARATIVE EXAMPLE 14

In Example 23, a thickness of the magnetic layer 30 was changed as shown in Table 1. Except for this, samples of Comparative Example 14 were prepared in the same manner as in Example 23. These samples do not satisfy the condition identified by the foregoing equation (2).

COMPARATIVE EXAMPLE 15

In Example 30, a thickness of the magnetic layer 30 was changed as shown in Table 1. Except for this, samples of Comparative Example 15 were prepared in the same manner as in Example 30. These samples do not satisfy the condition identified by the foregoing equation (2).

In the foregoing manner, various samples (Examples 1–41. Comparative Examples 1–15) were prepared as shown in Table 1. They were tested for magnetic property, electromagnetic transducer property and tape surface property as shown below.

Surface Roughness :SRa

The measurement was made, using a surface roughness testing device (produced by Kosaka Laboratory and marketed under trademark designation of "Surfcorder ET-30HK"), under the conditions of 20,000 magnifications, cut-off 80 μm, X pitch 1 μm, Y pitch 20 μm, and X length 500 μm×30 times. The measurement was made 3 times per sample and a mean value thereof was taken as measured data.

Electromagnetic Transducer Property (Output)

The play-back output of a recording signal having a wavelength of 7 MHz was measured using a Hi-8 deck (produced by Sony Corporation and marketed under product code of "EV-S900"). The sample of Comparative Example 1 was used as a reference (0 dB) for relative rating of the samples.

Still Property

By loading the tape sample in a Hi-8 deck (produced by Sony Corporation and marketed under product code of "EV-S900") and keeping the temporarily stopping state, a time until the RF-output became −16 dB was measured.

Number of Drop-outs (DO)

The RF-output was inputted from a Hi-8 deck (produced by Sony Corporation and marketed under product code of "EV-S900") into a DO counter, and the number of DO for 1 minute was measured with a counting condition of a width (time) being no less than 5 μsec and a depth (output drop) being no more than −16 dB.

The results are shown in Table 1 below.

In Table 1, particle kind A of the coating layer represents that the used nonmagnetic particles are organic particles of styrene-ethylene glycol dimethacrylate, particle kind B represents that the used nonmagnetic particles are silica, particle kind C represents that the used nonmagnetic particles are styrene-divinyl benzene type organic particles, and particle kind D represents that the used nonmagnetic particles are methyl methacrylate-divinyl benzene type organic par-

TABLE 1

| | | Coating layer | | | Magnetic layer | | | Surface roughness: | Out- | | | |
|---|---|---|---|---|---|---|---|---|---|---|---|---|
| | | Nonmagnetic particle | | | | | | | | | | |
| | | | | Adding | Thick- | | Abrasive | | | | | |
| | Sub-strate | Thickness (μm) | Particle kind | Size (nm) | amount (wt %) | ness (μm) | $d_{av}$ (μm) | $d_{mx}$ (μm) | SRa (nm) | put (dB) | Still (min.) | Number of DO | Overall rating |
| Example 1 | PET | 0.05 | A | 40 | 40 | 0.2 | 0.20 | 0.43 | 6.2 | +4.0 | 30 | 16 | ○ |
| Example 2 | PET | 0.1 | A | 40 | 40 | 0.2 | 0.20 | 0.43 | 5.8 | +5.0 | 40 | 9 | ⊚ |
| Example 3 | PET | 0.2 | A | 40 | 40 | 0.2 | 0.20 | 0.43 | 5.3 | +7.0 | 60 | 5 | ⊚ |
| Example 4 | PET | 0.5 | A | 40 | 40 | 0.2 | 0.20 | 0.43 | 5.0 | +7.0 | over 60 | 4 | ⊚ |
| Example 5 | PET | 0.2 | A | 40 | 40 | 0.08 | 0.20 | 0.43 | 5.8 | +5.0 | 30 | 13 | ⊚ |
| Example 6 | PET | 0.2 | A | 40 | 40 | 0.1 | 0.20 | 0.43 | 5.6 | +6.0 | 40 | 8 | ⊚ |
| Example 7 | PET | 0.2 | A | 40 | 40 | 0.5 | 0.20 | 0.43 | 5.2 | +5.0 | 50 | 6 | ⊚ |
| Example 8 | PET | 0.2 | A | 40 | 40 | 0.7 | 0.20 | 0.43 | 5.2 | +4.0 | 40 | 5 | ○ |
| Example 9 | PET | 0.2 | A | 40 | 40 | 1.0 | 0.20 | 0.43 | 5.1 | +4.0 | 30 | 5 | ○ |
| Example 10 | PET | 0.2 | A | 50 | 40 | 0.2 | 0.20 | 0.43 | 5.9 | +6.0 | 50 | 5 | ⊚ |
| Example 11 | PET | 0.2 | A | 70 | 40 | 0.2 | 0.20 | 0.43 | 6.3 | +6.0 | 60 | 9 | ⊚ |
| Example 12 | PET | 0.2 | A | 80 | 40 | 0.2 | 0.20 | 0.43 | 6.8 | +5.0 | 60 | 12 | ⊚ |
| Example 13 | PET | 0.2 | A | 40 | 10 | 0.2 | 0.20 | 0.43 | 5.9 | +5.0 | 30 | 9 | ⊚ |
| Example 14 | PET | 0.2 | A | 40 | 20 | 0.2 | 0.20 | 0.43 | 5.5 | +6.0 | 40 | 7 | ⊚ |
| Example 15 | PEN | 0.2 | A | 40 | 40 | 0.2 | 0.20 | 0.43 | 5.6 | +6.0 | 50 | 4 | ⊚ |
| Example 16 | PET | 0.2 | A | 40 | 40 | 0.2 | 0.27 | 0.64 | 6.5 | +4.0 | 60 | 12 | ○ |
| Example 17 | PET | 0.2 | A | 40 | 40 | 0.3 | 0.33 | 0.68 | 6.9 | +4.0 | over 60 | 18 | ○ |
| Example 18 | PET | 0.2 | A | 40 | 40 | 0.1 | 0.09 | 0.25 | 4.3 | +6.0 | 30 | 3 | ⊚ |
| Example 19 | PET | 0.2 | A | 40 | 40 | 0.5 | 0.30 | 0.81 | 7.7 | +4.0 | over 60 | 18 | ○ |
| Example 20 | PET | 0.2 | B | 40 | 40 | 0.2 | 0.20 | 0.43 | 6.1 | +4.0 | 30 | 10 | ○ |
| Example 21 | PET | 0.2 | A | 40 | 40 | 0.2 | 0.28 | 0.83 | 6.8 | +3.5 | over 60 | 17 | ○ |
| Example 22 | PET | 0.2 | A | 40 | 40 | 0.7 | 0.28 | 0.83 | 6.2 | +4.0 | 30 | 13 | ○ |
| Example 23 | PET | 0.2 | A | 40 | 40 | 0.5 | 0.32 | 1.06 | 6.9 | +3.5 | over 60 | 19 | ○ |
| Example 24 | PET | 0.5 | A | 40 | 40 | 0.4 | 0.32 | 1.06 | 6.9 | +3.5 | over 60 | 17 | ○ |
| Example 25 | PET | 0.5 | A | 40 | 40 | 0.7 | 0.32 | 1.06 | 6.7 | +3.5 | 40 | 15 | ○ |
| Example 26 | PET | 0.5 | A | 40 | 40 | 1.0 | 0.32 | 1.06 | 6.0 | +4.0 | 30 | 9 | ○ |
| Example 27 | PET | 0.2 | A | 40 | 40 | 0.3 | 0.25 | 0.90 | 6.7 | +3.5 | over 60 | 20 | ○ |
| Example 28 | PET | 0.2 | A | 40 | 40 | 0.4 | 0.25 | 0.90 | 6.5 | +4.0 | over 60 | 15 | ○ |
| Example 29 | PET | 0.2 | A | 40 | 40 | 0.3 | 0.20 | 0.43 | 5.3 | +6.0 | 50 | 5 | ⊚ |
| Example 30 | PET | 0.5 | A | 40 | 40 | 1.0 | 0.50 | 1.50 | 7.1 | +2.5 | 30 | 19 | ○ |
| Example 31 | PET | 0.1 | A | 80 | 10 | 0.2 | 0.20 | 0.43 | 6.2 | +4.0 | 60 | 11 | ⊚ |
| Example 32 | PET | 0.1 | A | 80 | 20 | 0.2 | 0.20 | 0.43 | 6.4 | +3.5 | 60 | 13 | ○ |
| Example 33 | PET | 0.1 | A | 80 | 40 | 0.2 | 0.20 | 0.43 | 7.2 | +2.5 | over 60 | 12 | ○ |
| Example 34 | PET | 0.1 | A | 40 | 10 | 0.2 | 0.20 | 0.43 | 5.6 | +5.0 | 40 | 10 | ⊚ |
| Example 35 | PET | 0.1 | B | 40 | 20 | 0.2 | 0.20 | 0.43 | 5.5 | +5.5 | 40 | 9 | ⊚ |
| Example 36 | PET | 0.2 | A | 40 | 60 | 0.2 | 0.20 | 0.43 | 5.8 | +5.0 | over 60 | 15 | ○ |
| Example 37 | PET | 0.2 | A | 80 | 10 | 0.2 | 0.20 | 0.43 | 6.3 | +6.0 | 60 | 9 | ⊚ |
| Example 38 | PET | 0.2 | A | 80 | 20 | 0.2 | 0.20 | 0.43 | 6.4 | +6.0 | 60 | 10 | ⊚ |
| Example 39 | PET | 0.2 | C | 40 | 40 | 0.2 | 0.20 | 0.43 | 5.4 | +6.0 | 50 | 9 | ⊚ |
| Example 40 | PET | 0.2 | D | 40 | 40 | 0.2 | 0.20 | 0.43 | 5.8 | +6.0 | over 60 | 12 | ⊚ |
| Example 41 | PET | 0.2 | A | 40 | 40 | 0.2 | 0.20 | 0.43 | 5.5 | +6.0 | 60 | 9 | ⊚ |
| Compara. 1 | PET | 0.03 | A | 40 | 40 | 0.2 | 0.20 | 0.43 | 7.1 | 0.0 | 1 | 50 | X X |
| Compara. 2 | PET | 0.2 | A | 40 | 40 | 1.5 | 0.20 | 0.43 | 5.2 | +4.0 | 5 | 6 | X |
| Compara. 3 | PET | — | — | — | — | 1.5 | 0.20 | 0.43 | 5.2 | +4.0 | 5 | 15 | X |
| Compara. 4 | PET | — | — | — | — | 0.2 | 0.20 | 0.43 | 9.2 | −4.0 | below 1 | 102 | X X |
| Compara. 5 | PET | — | — | — | — | 0.7 | 0.20 | 0.43 | 5.9 | +1.0 | 10 | 21 | X |
| Compara. 6 | PET | — | — | — | — | 1.0 | 0.20 | 0.43 | 5.5 | +2.0 | 20 | 22 | X |
| Compara. 7 | PET | 0.2 | A | 40 | 40 | 0.2 | 0.29 | 1.15 | 9.4 | −3.0 | over 60 | 39 | X X |
| Compara. 8 | PET | 0.2 | A | 40 | 40 | 0.3 | 0.25 | 1.23 | 9.2 | −2.0 | over 60 | 68 | X X |
| Compara. 9 | PET | 0.2 | α-Fe$_2$O$_3$ | 150 | 60 | 0.2 | 0.20 | 0.43 | 7.3 | −1.0 | 10 | 48 | X X |
| Compara. 10 | PET | 0.05 | A | 90 | >3 | 0.2 | 0.20 | 0.43 | 8.6 | −3.0 | 5 | 72 | X X |
| Compara. 11 | PET | 0.1 | A | 40 | 40 | 0.2 | 0.28 | 0.83 | 7.3 | +1.5 | over 60 | 47 | X |
| Compara. 12 | PET | 0.5 | A | 40 | 40 | 0.2 | 0.29 | 1.15 | 7.2 | +2.5 | over 60 | 30 | X |
| Compara. 13 | PET | 0.2 | A | 40 | 40 | 0.4 | 0.29 | 1.15 | 7.0 | +1.5 | over 60 | 27 | X |
| Compara. 14 | PET | 0.2 | A | 40 | 40 | 0.2 | 0.32 | 1.06 | 8.3 | 0.0 | over 60 | 40 | X |
| Compara. 15 | PET | 0.5 | A | 40 | 40 | 0.4 | 0.50 | 1.50 | 8.5 | −3.0 | over 60 | 90 | X X | ticles. In the indication of overall rating, "⊚" represents the best, and then the rating is lowered in order of "○", "X" and "XX".

The standard of judgment of "⊚" is identified by the output no less than +5 dB, the still no less than 30 minutes and the number of DO no more than 20. The standard of judgment of "○" is identified by the output no less than +2 dB, the still no less than 30 minutes and the number of DO no more than 20. On the other hand, unless these standards are satisfied, X or XX is determined depending on a degree. Incidentally, in Comparative Example 10, falling-off of the particles in the coating layer particularly takes place largely.

EXAMPLE 42

A sample of floppy disk was produced in the following fashion:

Production of Flexible Substrate 10 and Formation of Coating Layers 20

100 parts by weight of dimethyl terephthalate, 65 parts by weight of ethylene glycol and 0.09 parts by weight of magnesium acetate were put into a reactor which is heated to increase in temperature to achieve a transesterification while maintaining methanol. About 4 hours were required from the start of reaction to increasingly reach 230° C. where the transesterification was substantially finished. Then, 0.3 parts by weight of $SiO_2$ particles having an average particle size of 0.1 µm were added as ethylene glycol slurry. Thereafter, 0.4 parts by weight of ethyl acid phosphate and 0.04 parts by weight of antimony trioxide were added, while reducing a pressure of the reaction system from a normal pressure and heating to increase a temperature to achieve the final conditions of 1 mmHg and 285° C. After 4 hours, the reaction system was returned to the normal pressure and polyethylene terephthalate (hereinafter referred to as "PET") having a limiting viscosity of 0.66 was obtained.

The thus obtained PET was dried at 180° C. for 4 hours and then supplied to an extruder for melting at 290° C. The extruded polymer was wound around a casting drum held at a surface temperature of 40° C. to be cooled to solidify, using the electrostatic casting method, so that a non-stretched film (sheet) was produced.

This non-stretched film was stretched (or oriented) 3.6 times longer at 85° C. in a longitudinal direction thereof, using the roll stretching (or orientatioin) method. Subsequently, the coating liquid with the same composition as that in Example 1 was applied to both sides of the film by means of a bar coater for forming the coating layers 20. The applied film was introduced into a tenter to achieve a stretching (or orientatioin) treatment of 4.0 times longer in a width direction at 120 to 145° C. Then, the film was heat-fixed at 220° C. for 10 seconds to obtain a biaxial orien ted polyester film having a total thickness of 62 µm and a thickness (drying) of each of the coating layers of 0.2 µm (thus, a total thickness of the coating layers on both sides is 0.4 µm).

Formation of Magnetic Layers 30

The magnetic layers 30 as noted below were formed on the foregoing polyester film at both sides thereof.

A magnetic coating material for the formation of the magnetic layers was prepared with the following composition including magnetic powder of ferromagnetic metal having Hc=1680 Oe, $\sigma_s$=140 emu/g and an average length of major axis 0.15 µm).

Composition of Magnetic Coating Material for Formation of Magnetic Layer

| | |
|---|---|
| Magnetic powder of ferromagnetic metal | 100 parts by weight |
| Thermosetting vinyl chloride type copolymer (produced by Nippon Zeon K.K. and marketed under product code of "MR-110") | 15 parts by weight |
| Thermosetting polyurethane resin (produced by Toyo Boseki Co., Ltd. and marketed under product code of "UR-8200") | 16 parts by weight |
| α-alumina | 12 parts by weight |
| Carbon black | 4 parts by weight |
| Methylethyl ketone | 70 parts by weight |
| Toluene | 30 parts by weight |
| Cyclohexanone | 100 parts by weight |
| The foregoing composition was dispersed by means of a sand grinder mill, then added with the following composition and further dispersed so as to prepare the magnetic coating material. | |
| Butyl stearate | 1 part by weight |
| Sorbitan monostearate | 3 parts by weight |
| Neopentyl glycol dioleate | 5 parts by weight |
| Methylethyl ketone | 46 parts by weight |
| Toluene | 20 parts by weight |
| Cyclohexanone | 66 parts by weight |

The magnetic coating material thus obtained was mixed with 12 parts by weight, relative to 1000 parts by weight of the magnetic coating material, of a hardening agent (produced by Nippon Polyurethane Kogyo K.K. and marketed under trademark designation of "Coronate L"). The resultant mixture was applied on the foregoing PET film substrate having 62 µm in thickness at both sides thereof by means of the method of nozzle coating so as to provide the magnetic layer having 0.3 µm in thickness (drying) at each side of the PET film substrate. Then, the magnetic layers were given an orienting treatment in the magnetic field, dried and subjected to a calendering treatment. Thereafter, the resultant laminate was blanked into a doughnut shape and then left standing at 60° C. for no less than 24 hours so as to produce the floppy disk (Example Sample 42).

COMPARATIVE EXAMPLE 16

In Example 42, the coating layers 20 are not provided. Except for this, a floppy disk sample of Comparative Example 16 was prepared in the same manner as in Example 42.

COMPARATIVE EXAMPLE 17

In Example 42, a thickness of the magnetic layer 30 was changed to 1.5 µm. Except for this, a floppy disk sample of Comparative Example 17 was prepared in the same manner as in Example 42.

These three kinds of samples (Example 42 and Comparative Examples 16 and 17) were tested for output, resolution, overwrite (O/W) property and durability based on an evaluation method as identified below.

Evaluation Method

Using a floppy disk drive (produced by NEC Corporation and marketed under product code of "FD1335"), the output, the resolution and the overwrite property were examined in the following manner. The foregoing floppy disk drive was of an MFM (modified frequency modulation) recording type, whose recording wavelengths were changed as noted below for measurement in (2, 7) code mode.

Standard Specification 1F : 321. 5 KHz; 2F: 625 KHz
(F is abbreviation of Frequency)

Modified Specification RL7: 234 KHz ; RL2: 625 KHz
(RL is abbreviation of Run Length)

The foregoing floppy disk drive had a revolution speed of 360 rpm, a track radius at an innermost side 1 being 23.014 μm and a track radius at an outermost side 0 being 39.500 μm. Wavelengths and recording densities upon recording the foregoing frequencies are as follows:

When recording RL7 at the outermost side 0:
  Wavelength 6.35 μm
  Recording density 8.0 KFCI
    (FCI is abbreviation of Flux Change per Inch)
When recording RL2 at the outermost side 0:
  Wavelength 2.38 μm
  Recording density 21.3 KFCI
When recording RL7 at the innermost side 1:
  Wavelength 3.70 μm
  Recording density 13.7 KFCI
When recording RL2 at the innermost side 1:
  Wavelength 1.39 μm
  Recording density 36.6 KFCI (1) Output RL2 was recorded at the innermost side 1, and an average signal amplitude was measured by means of an oscilloscope.

(2) Resolution

RL7 and RL2 were recorded at the innermost side 1, and average signal amplitudes were measured by means of an oscilloscope, respectively. The resolution was derived from the following equation:

$$\text{Resolution} = (RL2av/RL7av) \times 100$$

wherein RL2av represents an average signal amplitude of RL2 and RL7av represents an average signal amplitude of RL7.

(3) Overwrite (O/W) Property

RL7 was recorded at the outermost side 0, and an average signal amplitude thereof was measured. Then, RL2 was overwritten without erasing RL7 so as to measure a residual average signal amplitude of RL7. An overwrite (O/W) value was derived from the following equation. For measuring the average signal amplitudes, a spectrum analyzer was used.

$$O/W \text{ value} = 20 \log (RL7reav/RL7av)$$

wherein RL7reav represents a residual average signal amplitude of RL7 and RL7av represents an average signal amplitude of RL7.

(4) Durability

The durability of the disk was examined by successively performing recording and replaying under the environmental conditions of low temperature (0° C.) and high temperature/low humidity (60° C., 10% RH), respectively, and measuring periods of time until the outputs were reduced to 80% of the initial output, respectively.

The results are shown in Table 2 below.

TABLE 2

| | | Coating layer | | | | Magnetic layer | | | Surface | Output | | | Durability |
|---|---|---|---|---|---|---|---|---|---|---|---|---|---|
| | | | Nonmagnetic particle | | | | | | roughness: | 36.6 | | | |
| | | | | | Adding | Thick- | Abrasive | | SRa | kFCI | Reso- | O/W | Low tem./ |
| | Sub-strate | Thickness (μm) | Particle kind | Size (nm) | amount (wt %) | ness (μm) | $d_{av}$ (μm) | $d_{mx}$ (μm) | (nm) | (%) | lution (%) | (dB) | High tem. (Hrs) |
| Example 42 | PET | 0.2 | A | 40 | 40 | 0.3 | 0.33 | 0.68 | 6.2 | 113.5 | 105.9 | −30.1 | 1659/1602 |
| Compara. 16 | PET | — | — | — | — | 0.3 | 0.33 | 0.68 | 9.5 | 89.1 | 97.0 | −29.6 | 95/80 |
| Compara. 17 | PET | — | — | — | — | 1.5 | 0.33 | 0.68 | 6.5 | 100.0 | 100.0 | −25.2 | 1590/1607 |

Compara.: Comparative Example

As seen from Table 2, the sample of Example 42 shows excellent results on all the measurement items. On the other hand, the sample of Comparative Example 16 is good in overwrite property, while, since the effect of the calendering treatment is low, the output is reduced, and further, the durability is not good, either. Since a thickness of the magnetic layer is large in the sample of Comparative Example 17, the overwrite property thereof is poor.

EXAMPLE 43

A magnetic coating material for the formation of the magnetic layer was prepared with the following composition including magnetic powder of ferromagnetic metal [Fe/Co/Al/Y=100/20/4.2/5.3 (weight ratio)] having Hc=2000 Oe, $\sigma_s$=140 emu/g, an average length of major axis 0.08 μm, and an average ratio of axes 5.

Composition of Magnetic Coating Material for Formation of Magnetic Layer

| | |
|---|---|
| Magnetic powder of ferromagnetic metal | 100 parts by weight |
| Vinyl chloride type copolymer (produced by Nippon Zeon K. K. and marketed under product code of "MR-110") | 8.3 parts by weight |
| Polyester polyurethane resin (produced by Toyo Boseki Co., Ltd. and marketed under product code of "UR-8300") | 8.3 parts by weight |
| α-alumina | 1 part by weight |
| Stearic acid | 1 part by weight |
| Butyl stearate | 1 part by weight |
| Methylethyl ketone | 111 parts by weight |
| Toluene | 111 parts by weight |
| Cyclohexanone | 74 parts by weight |

This composition was given a thorough kneading treatment in a kneader and then dispersed by means of a sand grinder mill. The magnetic coating material thus obtained and 3.3 parts by weight of a hardening agent (produced by Nippon Polyurethane Kogyo K.K. and marketed under trademark designation of "Coronate L") added thereto were mixed so as to prepare the coating material for the formation of the magnetic layer.

Subsequently, a coating material for the formation of the undercoating layer was prepared with the following composition.

Composition of Coating Material for Formation of Undercoating Layer

| | |
|---|---|
| α-Fe$_2$O$_3$ (produced by Toda Kogyo K.K. and marketed under product code of "DPN250BX") | 100 parts by weight |
| Vinyl chloride type copolymer (produced by Nippon Zeon K.K. and marketed under product code of "MR-110") | 10 parts by weight |
| Polyester polyurethane resin (produced by Toyo Boseki Co., Ltd. and marketed under product code of "UR8700") | 10 parts by weight |
| α-Al$_2$O$_3$ | 3 parts by weight |
| Stearic acid | 1 part by weight |
| Butyl stearate | 1 part by weight |
| Methylethyl ketone | 80 parts by weight |

-continued

| | |
|---|---|
| Toluene | 80 parts by weight |
| Cyclohexanone | 80 parts by weight |

This composition was given a thorough kneading treatment in a kneader and then dispersed by means of a sand grinder mill. The coating material thus obtained and 4 parts by weight of a hardening agent (produced by Nippon Polyurethane Kogyo K.K. and marketed under trademark designation of "Coronate L") added thereto were mixed so as to prepare the coating material for the formation of the undercoating layer.

The thus obtained coating material for the formation of the undercoating layer was applied on the substrate (on the coating layer 20) used in Example 3 so as to provide the undercoating layer having 0.5 μm in thickness. The undercoating layer was then dried, subjected to a calendering treatment and further subjected to a thermosetting treatment so that the undercoating layer was finally formed. Subsequently, the foregoing magnetic coating material was applied on the undercoating layer so as to provide the magnetic layer having 0.2 μm in thickness (drying). Then, the magnetic layer was given an orienting treatment in the magnetic field, dried and subjected to a calendering treatment.

Subsequently, the coating material for the formation of the backcoat layer used in Example 1 was applied to the other side of the substrate (the side not covered by the magnetic layer). Then, the resultant backcoat layer was subjected to a calendering treatment and a thermosetting treatment. Thereafter, the resultant laminate was cut into strips of 8 mm in width to produce samples of the magnetic recording medium in the form of tapes (Example 43).

COMPARATIVE EXAMPLE 18

In Example 43, the substrate with no coating layer 20 was used. Except for this, samples of Comparative Example 18 were prepared in the same manner as in Example 43.

For these two kinds of samples (Example 43 and Comparative Example 18), the foregoing measurement items for the magnetic tape samples, that is, the surface roughness SRa, the electromagnetic transducer property (output), the still property and the number of drop-outs (DO), were measured.

The results are shown in Table 3 below.

TABLE 3

| | | | Coating layer | | | | | | | | | | |
|---|---|---|---|---|---|---|---|---|---|---|---|---|---|
| | | | Nonmagnetic particle | | | Magnetic layer | | | Surface | | | | |
| | | | | | Adding | Thick- | Abrasive | | roughness: | Out- | | | |
| | Sub-strate | Thickness (μm) | Particle kind | Size (nm) | amount (wt %) | ness (μm) | $d_{av}$ (μm) | $d_{mx}$ (μm) | SRa (nm) | put (dB) | Still (min.) | Number of DO | Overall rating |
| Example 43 | PET | 0.2 | A | 40 | 40 | 0.2 | 0.20 | 0.43 | 5.2 | +7.0 | 60 | 5 | ○ |
| Compara. 18 | PET | — | — | — | — | 0.2 | 0.20 | 0.43 | 7.1 | +1.0 | 30 | 18 | X |

Compara.: Comparative Example

As seen from Table 3, since the sample of Comparative Example 18 has no coating layer, the effect of the calender treatment is small even if the undercoating layer is provided, so that the surface roughness SRa of the medium is enlarged. Thus, the electromagnetic transducer property (output) is lowered.

As described above, according to the preferred embodiment of the present invention, the magnetic recording medium is provided on the flexible substrate with the coating layer including the binder and the nonmagnetic particles and having the given thickness as a result of the stretching (or orientation) treatment performed at least once, and further provided with the given magnetic layer formed on the coating layer. Thus, the magnetic recording medium is excellent in productivity and further improves the surface property of the thin magnetic layer. This achieves the high outputs at the shorter wavelength region and further achieves the excellent running durability.

It is to be understood that this invention is not to be limited to the preferred embodiment and modifications described above, and that various changes and modifications may be made without departing from the spirit and scope of the invention as defined in the appended claims.

What is claimed is:

1. A magnetic recording medium comprising:

a flexible substrate;

a coating layer formed on said flexible substrate; and a magnetic layer formed on said coating layer, wherein said coating layer contains a binder and nonmagnetic particles and has a thickness in the range of 0.05 to 0.7 μm as a result of a stretching treatment, wherein said stretching treatment comprises stretching said flexible substrate in a longitudinal direction prior to application of said coating layer, and stretching in a lateral direction at least once after application of said coating layer on said flexible substrate, wherein said magnetic layer contains magnetic powder, a binder and an abrasive and has a thickness in the range of 0.05 to 1.0 μm, wherein said nonmagnetic particles contained in said coating layer has an average particle size in the range of 0.01 to 0.08 μm, and wherein said abrasive contained in said magnetic layer has an average particle size in the range of 0.05 to 0.8 μm and satisfies conditions defined by the following equations (1) and (2):

$$d_{mx} \leq (d_{av} \times 2.0) + 0.5 \quad \text{equation (1)}$$

$$d_{mx} \leq t_c + t_m + 0.5 \quad \text{equation (2)}$$

wherein $d_{mx}$ represents a maximum particle size of said abrasive, $d_{av}$ represents an average particle size of said abrasive, $t_c$ represents a thickness of said coating layer, and $t_m$ represents a thickness of said magnetic layer.

2. A magnetic recording medium according to claim 1, wherein a thickness of said coating layer is in the range of 0.1 to 0.5 μm, a thickness of said magnetic layer is in the range of 0.08 to 0.7 μm, an average particle size of said nonmagnetic particles is in the range of 0.02 to 0.06 μm, and an average particle size of said abrasive is in the range of 0.08 to 0.5 μm.

3. A magnetic recording medium according to claim 1, wherein said nonmagnetic particles are contained in said coating layer in the range of 3 to 60% by weight.

4. A magnetic recording medium according to claim 1, wherein said nonmagnetic particles are contained in said coating layer in the range of 20 to 50% by weight.

5. A magnetic recording medium according to claim 1, wherein said abrasive is contained in said magnetic layer in the range of 0.1 to 20% by weight.

6. A magnetic recording medium according to claim 1, wherein said abrasive is contained in said magnetic layer in the range of 0.5 to 15% by weight.

7. A magnetic recording medium according to claim 1, wherein said abrasive is contained in said magnetic layer in the range of 1.0 to 10% by weight.

8. A magnetic recording medium according to claim 1, wherein the blinder contained in said coating layer is one of water-soluble and water-dispersive resins.

9. A magnetic recording medium according to claim 1, wherein said magnetic recodding medium is a magnetic tape.

10. A magnetic recording medium according to claim 1, wherein said magnetic recording medium is a floppy disk.

* * * * *